US008221710B2

(12) United States Patent
Stiksma et al.

(10) Patent No.: US 8,221,710 B2
(45) Date of Patent: Jul. 17, 2012

(54) RECOVERING METALS FROM COMPLEX METAL SULFIDES (75) Inventors: John Stiksma, St. Albert (CA); Roman Berezowsky, St. Albert (CA)

(73) Assignee: Sherritt International Corporation, Fort Saskatchewan, Alberta (CA)

(*) Notice: Subject to any disclaimer, the term of this patent is extended or adjusted under 35 U.S.C. 154(b) by 159 days.

(21) Appl. No.: 12/700,640

(22) Filed: Feb. 4, 2010

(65) Prior Publication Data
US 2010/0199807 A1 Aug. 12, 2010

Related U.S. Application Data (63) Continuation-in-part of application No. 11/946,736, filed on Nov. 28, 2007, now Pat. No. 7,658,895.

(51) Int. Cl.
*C01G 37/00* (2006.01)
(52) U.S. Cl. ............... 423/53; 423/55; 423/56; 423/58
(58) Field of Classification Search ............... 423/53, 423/55, 56, 58
See application file for complete search history.

(56) References Cited

U.S. PATENT DOCUMENTS

| 2,313,940 | A | 3/1943 | Hirsch et al. |
| 2,521,757 | A | 9/1950 | Smith |
| 3,455,677 | A | 7/1969 | Litz |
| 3,763,303 | A | 10/1973 | Khuri et al. |
| 3,903,241 | A | 9/1975 | Stevens et al. |
| 4,040,958 | A | 8/1977 | Rammler |
| 4,131,455 | A | 12/1978 | Edwards et al. |
| 4,145,397 | A | 3/1979 | Toida et al. |
| 4,216,118 | A | 8/1980 | Yoshida et al. |
| 4,220,634 | A | 9/1980 | Deschamps et al. |
| 4,374,100 | A | 2/1983 | Sebenik et al. |
| 4,409,190 | A | 10/1983 | Van Leirsburg |
| 4,411,874 | A | 10/1983 | Lee |

(Continued)

FOREIGN PATENT DOCUMENTS
WO WO 92/03520 3/1995

OTHER PUBLICATIONS

PCT Search Report and Written Opinion, Jul. 29, 2009.

*Primary Examiner* — Melvin C Mayes
*Assistant Examiner* — Melissa Stalder
(74) *Attorney, Agent, or Firm* — Arne I. Fors (57) ABSTRACT

Methods for recovering base metals, including, among other metals, molybdenum and nickel, from metal sulfides containing a Group VIB metal and a Group VIII metal. Generally, the methods comprise: contacting metal sulfides with a leaching solution containing ammonia and air to dissolve the metals into the leaching solution, forming a slurry containing soluble complexes of the metals, ammonium sulphate and solid residue containing ammonium metavanadate and any carbonaceous materials. The solid residue containing ammonium metavanadate and carbonaceous materials is then separated from the slurry and metal complexes are precipitated from the slurry by adjusting the pH. A second slurry may be formed comprising a second solid residue and a primary filtrate comprising ammonium sulfate solution that is substantially free of metals. The second solid residue is separated from the primary filtrate comprising ammonium sulfate by any means suitable for separation of solids from liquids and is then dissolved, at a second pre-selected pH, to form a Group VIB metal precipitate and a Group VIII metal containing solution. Group VIB and Group VIII metals can be easily recovered from the precipitate and solution, respectively. In some embodiments Group VB metals are recovered as well.

67 Claims, 3 Drawing Sheets

U.S. PATENT DOCUMENTS

| | | | |
|---|---|---|---|
| 4,417,972 A | 11/1983 | Francis et al. | |
| 4,432,953 A | 2/1984 | Hubred et al. | |
| 4,434,043 A | 2/1984 | Singhal et al. | |
| 4,500,495 A | 2/1985 | Hubred et al. | |
| 4,541,868 A | 9/1985 | Lowenhaupt et al. | |
| 4,548,700 A | 10/1985 | Bearden, Jr. et al. | |
| 4,554,138 A | 11/1985 | Marcantonio | |
| 4,557,821 A | 12/1985 | Lopez et al. | |
| 4,661,265 A | 4/1987 | Olson et al. | |
| 4,710,486 A | 12/1987 | Lopez et al. | |
| 4,732,664 A | 3/1988 | Solari Martini et al. | |
| 4,762,812 A | 8/1988 | Lopez et al. | |
| 4,778,605 A | 10/1988 | Anthoney et al. | |
| 4,824,821 A | 4/1989 | Lopez et al. | |
| 4,832,925 A | 5/1989 | Weir et al. | |
| 4,857,496 A | 8/1989 | Lopez et al. | |
| 4,861,565 A | 8/1989 | Sefton et al. | |
| 4,900,522 A | 2/1990 | Chou et al. | |
| 4,970,190 A | 11/1990 | Lopez et al. | |
| 5,008,001 A | 4/1991 | Kitamura et al. | |
| 5,094,991 A | 3/1992 | Lopez et al. | |
| 5,099,047 A | 3/1992 | Sato et al. | |
| 5,162,282 A | 11/1992 | Lopez et al. | |
| 5,164,075 A | 11/1992 | Lopez | |
| 5,178,749 A | 1/1993 | Lopez et al. | |
| 5,246,570 A | 9/1993 | Cronauer et al. | |
| 5,294,329 A | 3/1994 | Kramer | |
| 5,298,152 A | 3/1994 | Kramer | |
| 5,415,849 A | 5/1995 | Toyabe et al. | |
| 5,420,088 A | 5/1995 | Silva et al. | |
| 5,424,263 A | 6/1995 | Buehler | |
| 5,457,258 A | 10/1995 | Hommeltoft et al. | |
| 5,484,755 A | 1/1996 | Lopez | |
| 5,505,857 A | 4/1996 | Misra et al. | |
| 5,573,556 A | 11/1996 | Wen | |
| 5,935,418 A | 8/1999 | Chakrabarty et al. | |
| 6,153,155 A | 11/2000 | Wen et al. | |
| 6,180,072 B1 | 1/2001 | Veal et al. | |
| 6,511,937 B1 | 1/2003 | Bearden, Jr. et al. | |
| 6,589,492 B2 | 7/2003 | Matsumoto et al. | |
| 6,673,732 B2 | 1/2004 | Muhler et al. | |
| 6,733,564 B1 | 5/2004 | Sahu et al. | |
| 6,974,842 B1 | 12/2005 | Spena et al. | |
| 7,033,480 B2 | 4/2006 | King | |
| 7,067,090 B2 | 6/2006 | Han et al. | |
| 7,182,926 B2 | 2/2007 | Akahoshi | |
| 2003/0098262 A1 | 5/2003 | Rendall | |
| 2003/0130118 A1 | 7/2003 | Koyama et al. | |
| 2004/0219082 A1 | 11/2004 | Matjie et al. | |
| 2004/0237720 A1 | 12/2004 | Moyes et al. | |
| 2004/0241066 A1 | 12/2004 | Jasra et al. | |
| 2005/0101480 A1 | 5/2005 | Ackerman et al. | |
| 2005/0109674 A1 | 5/2005 | Klein | |
| 2005/0118081 A1 | 6/2005 | Harris et al. | |
| 2005/0249652 A1 | 11/2005 | Scharifker et al. | |
| 2006/0051875 A1 | 3/2006 | Reppy et al. | |
| 2006/0135631 A1 | 6/2006 | Kopponen et al. | |
| 2006/0151399 A1 | 7/2006 | Brandts et al. | |
| 2006/0258531 A1 | 11/2006 | Koyama et al. | |
| 2006/0272982 A1 | 12/2006 | Montanari et al. | |
| 2007/0025899 A1 | 2/2007 | Marcantonio | |
| 2007/0098609 A1 | 5/2007 | McConnell | |
| 2007/0144944 A1 | 6/2007 | Del Bianco et al. | |

RECOVERING METALS FROM COMPLEX METAL SULFIDES

RELATED APPLICATIONS

This application is a continuation-in-part of and claims priority to U.S. patent application Ser. No. 11/946,736 filed Nov. 28, 2007.

FIELD OF THE INVENTION

This invention relates to a process for recovering metals from complex metal sulfides.

BACKGROUND

Catalysts have been used widely in the refining and chemical processing industries for many years. Hydroprocessing catalysts, including hydrotreating and hydrocracking catalysts, are now widely employed in facilities worldwide. Used or "spent" hydroprocessing catalysts discharged from these facilities typically contain metal components such as molybdenum, nickel, cobalt, vanadium, and the like in the form of complex metal sulfides.

In order to recycle catalytic metals and provide a renewable source for the metals, efforts have been made to extract metals from spent catalysts, whether in supported or bulk catalyst form. US Patent Publication No. 2007/0025899 discloses a process to recover metals such as molybdenum, nickel, and vanadium from a spent catalyst with a plurality of steps and equipment to recover the molybdenum and nickel metal complexes. U.S. Pat. No. 6,180,072 discloses another complex process requiring solvent extraction as well as oxidation steps to recover metals from spent catalysts containing at least a metal sulfide.

Shales, especially those that contain appreciable quantities of organic carbon, have long been known to be enriched with a variety of transition metals in the form of complex metal sulfides, especially sulfides of Mo, Ni, Co, Cu, Cr, V, Pb, U and Ag. Mineralogical studies have revealed a variety of these metal sulfides in shales of which metal-rich black shales are the most common type.

Molybdenum-rich black shales contain sulfide beds with more than 2% of each of Mo and Ni, about 2% Zn and 200 to 700 mg/t each for Au, Pt and Pd. Ores averaging about 4% Mo and containing up to 4% Ni, 2% Zn and precious metals are recovered in which the Mo-bearing phase is recovered directly from the ore by roasting followed by caustic leaching to produce ammonium molybdate.

Significant mineralization of nickel and molybdenum occur in ore deposits in association with uranium mineralization. Pyrite occurring in the zone of uranium mineralization has been found to contain up to 2 to 4% Ni. Nickel also occurs as millerite, pentlandite and its alteration product violarite, along with the copper sulfides. Molybdenum occurs as molybdenite. The mineral assemblage constitutes a unique hematitic uranium-nickel-molybdenum sulfide ore.

There is a need for an improved and simplified process to recover metals including but not limited to molybdenum, nickel, cobalt and vanadium, from complex metal sulfide ores treated by crushing, grinding, screening, flotation and the like known beneficiating techniques to produce a bulk concentrate from which the molybdenum can be separately recovered from the nickel and other metals.

SUMMARY OF THE INVENTION

In one aspect, the invention relates to a method for recovering base metals, including, among other metals, molybdenum and nickel from metal sulfides containing a Group VIB metal and a Group VIII metal, the method comprising the steps of: contacting the metal sulfides with a leaching solution containing ammonia and air to dissolve the group VIB metal and the Group VIII metal into the leaching solution, forming a pressure leach slurry containing at least a group VIB soluble metal complex, at least a group VIII soluble metal complex, ammonium sulphate and solid residue containing ammonium metavanadate and any carbonaceous materials, separating and removing the solid residue containing ammonium metavanadate and carbonaceous materials from the pressure leach slurry; precipitating from the pressure leach solution at least a portion of the Group VIB metal and at least a portion of the Group VIII metal, wherein the precipitation is carried out at a first pre-selected pH to precipitate as metal complexes at least a portion of the Group VIB metal and at least a portion of the Group VIII metal. A slurry may be formed comprising the second solid residue and a primary filtrate comprising ammonium sulfate solution that is substantially free of Group VIB and the Group VIII metals; by a means of separation separating from said slurry the second solid residue and the primary filtrate; dissolving the second solid residue, at a second pre-selected pH, to form a group VIB metal precipitate and a group VIII metal containing solution; separating the group VIB metal precipitate from the Group VIII metal containing solution and dissolving said Group VIB metal precipitate in a dilute base at a sufficient temperature to form a Group VIB metal product.

In another aspect, the invention relates to a method for recovering vanadium, molybdenum and nickel from metal sulfides, the method comprising the steps of: contacting finely divided metal sulfides with a leaching solution containing ammonia and air to dissolve the molybdenum and nickel into the leaching solution, forming a pressure leach slurry containing molybdenum and nickel metal complexes, ammonium sulphate and solid residue containing ammonium metavanadate; separating and removing the solid residue containing ammonium metavanadate from the pressure leach slurry; adjusting the pH of the pressure leach solution by the addition of sulfuric acid to precipitate at least a portion of the molybdenum and nickel as metal complexes; separating and recovering molybdenum and nickel metal complexes from the supernatant containing 0.1 to 5% of the incoming molybdenum, 1 to 20% of the incoming vanadium, and 1 to 35% of the incoming nickel.

In one embodiment, the method further comprises the step of adding $H_2S$ to the supernatant to precipitate out the remaining molybdenum and nickel metal complexes, and subsequent recovery of the molybdenum and nickel metal sulfides from the ammonium sulphate supernatant.

In another aspect, the invention relates to a method for recovering molybdenum and nickel from metal sulfides to recover substantial amounts of a Group VIII metal, the method comprising: recovering a secondary filtrate comprising substantially the Group VIII soluble metal complex and a trace amount of Group VIB metals; combining the secondary filtrate with the primary filtrate to form a combined filtrate comprising substantially the Group VIII soluble metal complex and a trace quantity of Group VIB metals; precipitating from the combined filtrate the Group VIB and Group VIII metals in a sulfidation process to form a third solid residue and a tertiary filtrate; separating the third solid residue from the tertiary filtrate and dissolving the third solid residue to form a group VIII metal product solution.

In another embodiment, the invention relates to a method for recovering molybdenum, and nickel from metal sulfides and producing ammonium sulfate useful for other processes, such as fertilizer, the method comprising: all of the above processes and further comprising subjecting the tertiary filtrate to sulfamate destruction by hydrolysis to recover a purified ammonium sulfate solution.

In another embodiment, the method further comprises the step of adding $H_2S$ to a combination of the primary filtrate and the secondary filtrate to precipitate the remaining molybdenum and nickel metal complexes, and recovering, by a means of separation, a solid residue comprising molybdenum and nickel sulfides and vanadium oxides and a filtrate comprising primarily ammonium sulfate and minor amounts of molybdenum, nickel and vanadium. In another embodiment said solid residue is leached at acidic pH in the presence of oxygen, for a sufficient time and at a sufficient temperature, to form a desirable nickel sulfate product solution. In yet another embodiment the filtrate, comprising primarily ammonium sulfate, is processed hydrolyze sulfamate to produce a purified, commercial grade, ammonium sulfate product having very low amounts of molybdenum and nickel metals that can be further processed for other uses, such as for fertilizer.

BRIEF DESCRIPTION OF THE DRAWINGS

Embodiment of the process of the invention will now be described with reference to the drawings, in which.

DETAILED DESCRIPTION

The Periodic Table referred to herein is the Table approved by IUPAC and the U.S. National Bureau of Standards, an example of which is the Periodic Table of the Elements by Los Alamos National Laboratory's Chemistry Division of October 2001.

In one embodiment, the metal sulfides are crushed and ground to an effective median particle size of 0.01 to 200 microns. In another embodiment, the metal sulfides have an average particle size of 0.01 to 100 microns. In a third embodiment, the metal sulfides are in a dispersed slurry having an average particle size of 5.0 to 50 microns.

Figure 1:
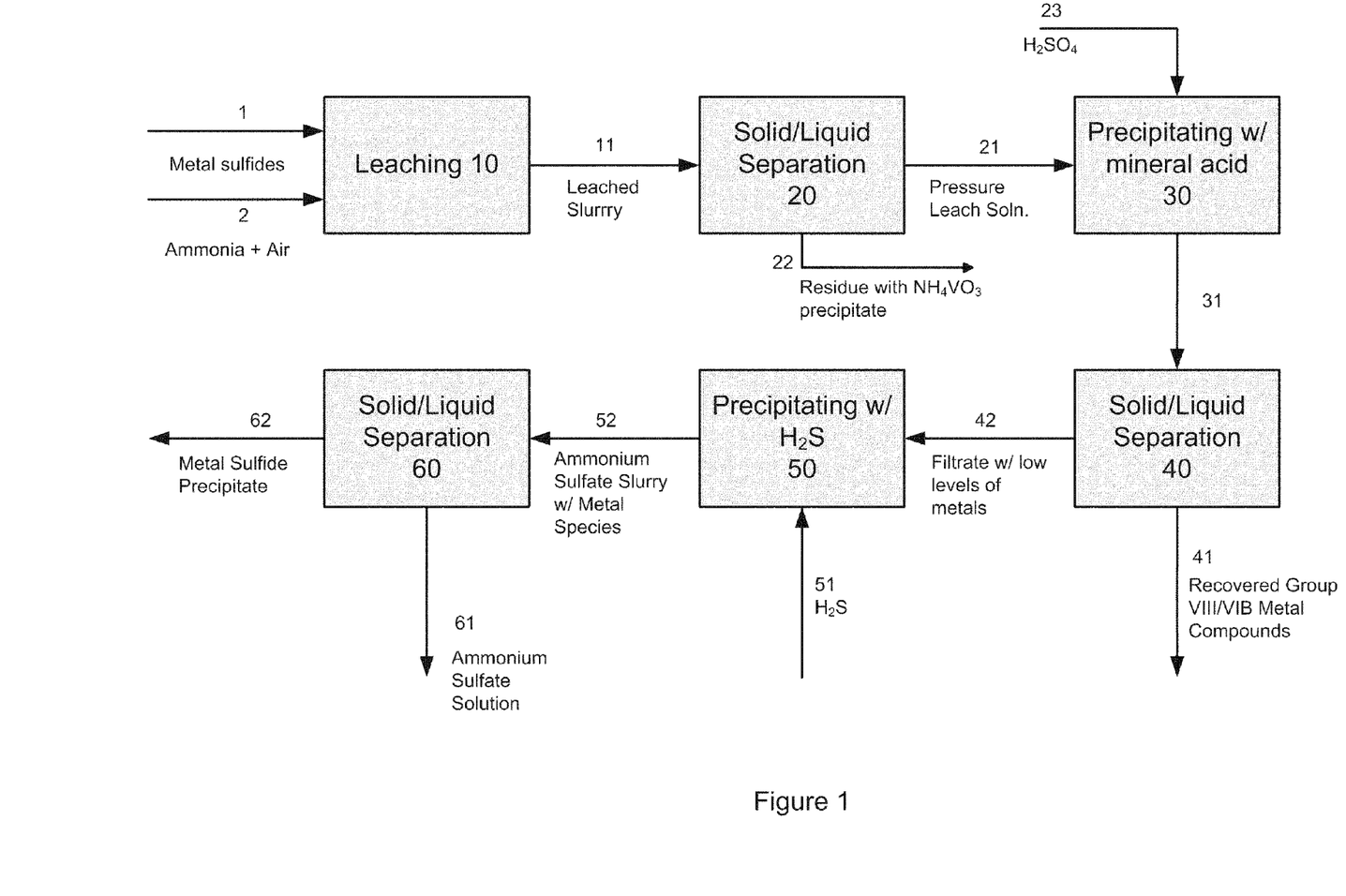
FIG. 1 is an overview of the metal recovery process of the invention.

Leaching: With reference to FIG. 1, the metal sulfide particles in stream 1 are leached with an aqueous solution 2 containing ammonia and air in an autoclave 10, i.e., a multi-chambered, agitated vessel at a sufficient temperature and pressure, in which ammonia and air are supplied to induce leaching reactions, wherein the group VIB and group VIII metals are leached into solution forming group VIB and group VIII soluble metal complexes. In one embodiment, up to 90% of the (incoming) group VB metal in the feed stays in the solid phase (following discharge from the autoclave) and up to 10% of the incoming group VB metal is leached into solution. For example, for a feed stream containing 0.5 wt. % vanadium, up to 0.050 wt % ends up in the leach solution (based on the total weight of the feed stream).

In one embodiment, vanadium (if any) is converted into ammonium metavanadate, molybdenum is converted into molybdate compounds including ammonium orthomolybdate, and portions of nickel and cobalt (if any) are converted into amine complexes, e.g., cobalt amine sulfate, nickel amine sulfate, or the like, thereby being leached. In one embodiment, at least 70 wt % of the group VIB and group VIII metals are leached into solution. In another embodiment, at least 90 wt % of the nickel and molybdenum are leached into solution.

In one embodiment, as shown in FIG. 1, the particulate metal sulfide in stream 1 is pressure leached with the addition of ammonia and air in stream 2 to induce solubilization or leaching of metal sulfides from the feed material. In one embodiment of the ammoniacal pressure leach, the leaching is carried out at a pressure proportional to the temperature. In a second embodiment, the sufficient leach temperature is between 120 to 250° C. In a third embodiment, the sufficient leach temperature is between 135 to 225° C. In one embodiment, the sufficient autoclave pressure is in the range of 0-1200 psig. In a second embodiment, from 100-1000 psig. In a third embodiment from 300 psig through about 800 psig.

In one embodiment, the metal sulfide particles are pressure leached from 60 minutes to 360 minutes. In another embodiment, the metal sulfide particles are pressure leached from 120 minutes to 300 minutes. In a third embodiment, the pressure leach is for a period of less than 240 minutes.

In one embodiment, the concentration of the leaching species and the pH of the leach solution are optimized with sufficient amounts of ammonia to complex the nickel, molybdenum, vanadium (if any) and cobalt (if any), and with sufficient free ammonia to control the pH within a range of 9 to 13. In one embodiment, the molar ratio of ammonia to nickel (plus any cobalt, if present) plus molybdenum plus vanadium (if any) is in the range of 20:1 to 30:1. In another embodiment, the ammonia concentration is maintained at a level of at least 1 wt %, and in a range of 2-7 wt % in yet another embodiment.

In one embodiment, the pressure leaching is carried out in an ammoniacal media at a pressure ranging from 0 to 1200 psig, at a temperature ranging from 100 to 300° C., and at a pH level of 8.0 or higher in order to efficiently allow the leaching reaction to progress. In another embodiment, the pH level is maintained between a range of 9 to 12.

In yet another embodiment (not shown in FIG. 1), the leached slurry 11 following depressurizing is transferred to a depositing/holding tank equipped with appropriate equipment to further reduce the leached slurry temperature to 90° C. or less, prior to the next separation step.

Separating/Recovering Vanadium: The partially cooled leached slurry 11 is subject to liquid-solid separation via physical methods known in the art, e.g., settling, centrifugation, decantation, or filtration using a vertical type centrifugal filter or a vacuum filter or a plate and frame filter, and the like, into a liquid stream 21 (Pressure Leach Solution stream) containing the group VIB and VIII metal complexes together with ammonium sulfate and a small amount of any group VB metal complexes (up to 10 wt % of the incoming group VB metal); the solid residue 22 comprises any carbonaceous material and any group VB metal complex (up to 90 wt % of the incoming group VB metal). In one embodiment, the solid residue 22 comprises ammonium-containing vanadium salts such as ammonium metavanadate ($NH_4VO_3$). The filtrate or PLS (Pressure Leach Solution) stream 21 is subject to a precipitation step. Vanadium, as ammonium metavanadate ($NH_4VO_3$) is subsequently recovered from the residue 22.

In one embodiment, liquid-solid separation of the leached slurry 11 is carried out in a filtration device, wherein the solid residue 22 containing any $NH_4VO_3$ precipitate and any carbonaceous material is separated out in the form of a filter cake containing molybdenum sulfide, nickel hydroxides and small amounts of ammonium sulphate from the pressure leach solution containing ammonium molybdate, nickel amine sulfate and ammonium sulfate. Group VB metals such as vanadium can be subsequently extracted/recovered from the filter cake, according to U.S. Patent Publication No. US2007/0025899, incorporated herein by reference, by temperature and pH modification; purified $NH_4VO_3$ is crystallized as a wet solid and subsequently dried and calcined into vanadium pentoxide pellets. The recovered vanadium has diverse industrial applications, including use as a chemical catalyst, preparation of stainless/alloy steels, superconducting magnets and the construction of batteries.

In one embodiment following liquid-solid separation, the Pressure Leach Solution (PLS) stream contains 10 to 100 gpL (grams per liter) molybdenum, 1 to 20 gpL nickel, 0.05 to 2.0 gpL vanadium, and 50 to 1000 gpL ammonium sulfate. In a second embodiment, the PLS stream contains 20 to 100 gpL molybdenum, 5 to 20 gpL nickel, 0.10 to 1.0 gpL vanadium, and 100 to 500 gpL ammonium sulfate.

Precipitating Metal Complexes from the Pressure Leach Solution: In one embodiment of this step, the pH of the PLS 21 is controlled to a level at which selective precipitation of the metal complexes occurs ("pre-selected pH"), precipitating as metal complexes at least 90% of the Group VIB metal, at least 90% of the Group VIII metal, and at least 40% of any Group VB metal initially present prior to the precipitation. In one embodiment, about 50-80% of the vanadium leached into the PLS is recovered with the Mo—Ni precipitate with the rest remaining in solution. Up to 90% of the vanadium in solution can be subsequently recovered in an optional subsequent sulfidation step to further precipitate any molybdenum and nickel remaining in solution.

In one embodiment, the pH is adjusted to precipitate as metal complexes at least at least 95% of the Group VIB metal. In another embodiment, the pre-selected pH is less than about 3.5 to start precipitating at least 90% of soluble molybdenum complexes. In another embodiment, the pre-selected pH is from pH 1.0 to about 2.0 to initiate precipitation of at least 95% of soluble tungsten complexes. Generally, several metals can form a precipitate at a given pH. For example, at a pH level of less than 3, both Mo and Ni (and Co, if any) precipitate although more molybdenum precipitates relative to nickel. Additionally, the precipitating concept described herein can be repeated at another pH or pH range to precipitate other metals.

In one embodiment wherein the group VIB metal is molybdenum and there is an interest in precipitating most or a major portion of the molybdenum, the pH of the PLS is reduced from greater than 9.0 to less than 3.5 to precipitate greater than 90% of the Mo. In a second embodiment, the pH of the PLS is adjusted to a level of 3.0 to 3.3 to precipitate greater than 92% of the Mo. In a third embodiment, the pH of the PLS is adjusted to a level of 2.65 to 3.0 to precipitate greater than 95% of the Mo.

In one embodiment, a strong mineral acid 23 is added to the precipitating/mixing vessel 30 to adjust the pH. In another embodiment (not shown), the acid is added to the pressure leach solution 21 (PLS) feedstream. The acid used to precipitate the metal complexes may include any inorganic mineral acid with a relatively high ionization constant. In one embodiment, the acid is used in a strength ranging from 1.0 to 12.0 normal. In another embodiment, the acid is selected from the group of sulfuric acid, hydrochloric acid, phosphoric acid, nitric acid, and the like.

In another embodiment (not shown), a sulfur compound having a sulfhydryl group or an ionized sulfhydryl group or a sulfur compound, which is capable of producing a sulfhydryl group or an ionized sulfhydryl group, is used to adjust the pH of the PLS and induce precipitation. Examples include but are not limited to any sulfur compound which has a sulfhydryl (—SH) group or an ionized sulfhydryl group (—S(−1)). Compounds containing a sulfhydryl or an ionized sulfhydryl group include hydrogen sulfide and inorganic compounds containing sulfide ion, hydrosulfide ion or trithiocarbonate ion as well as organic compounds such as dithiocarbamates, xanthates, mercaptans and the soluble metal salts of these compounds, i.e., the alkali metal and alkaline earth metal salts. Furthermore, sulfur compounds which are capable of producing a sulfhydryl or an ionized sulfhydryl group, e.g., thioacetamide and reducible disulfides, can also be used. Examples of organic sulfur compounds which can be used include sodium, potassium or calcium salts of the following ions: ethyl xanthate ion, glucose xanthate ion, isopropyl xanthate ion, dimethyldithiocarbamate ion or diethyldithiocarbamate ion. Examples of inorganic sulfur compounds include sodium trithiocarbonate, potassium trithiocarbonate, calcium trithiocarbonate, sodium sulfide, potassium sulfide or calcium sulfide.

In one embodiment (not shown), the sulfur compound is a sulfide-containing compound, e.g., a water soluble sulfide, a water soluble polysulfide, or mixtures thereof, is employed to adjust the pH of the Pressure Leach Solution 21 to a level at which precipitation of the metal complexes occurs. In one embodiment, hydrogen sulfide, a combination of hydrogen sulfide and caustic soda, ammonium sulfide, NaHS, or $Na_2S$, or mixtures thereof is used in an amount of about 0.05 to 0.2 molar to precipitate out nickel, molybdenum, cobalt, and the like from the Pressure Leach Solution 21.

In one embodiment, the precipitation is carried out under mixing conditions in vessel 30 at a temperature in the range of 50 to 95° C., a pH level of 1 to 4, and for a sufficient amount of time, e.g., for at least 1 hour, for at least 90% of the molybdenum and nickel in the PLS to precipitate out as a metal complexes. In another embodiment, the precipitation is carried out at a temperature of 70° C. to 80° C. and a pH level of between 2.5 to 3.3. In one embodiment, at least 95% of the molybdenum precipitates out after 2 hours as a molybdenum compound such as ammonium octamolybdate. In another embodiment, at least 90% of the nickel precipitates out with the molybdenum as nickel ammonium sulfate.

In one embodiment, the pH of the PLS is continuously regulated for at least part of the precipitation step with the continuous addition of the additive, e.g., mineral acid or sulfide-containing compound, to control the rate of the precipitation as well as the type of metal complexes precipitating from the PLS.

In one embodiment, a sufficient amount of sulfuric acid (20-100% by weight) is used to adjust the pH of the PLS to less than 3.5. In another embodiment, a sufficient amount of sulfuric acid is added to the PLS to target a pH of 3.0, with the mixture being maintained at a temperature of 60 to 90° C. for 1 to 3 hours, until 99% of the molybdenum precipitates out as molybdate compounds.

pH controllers known in the art can be used to automatically measure and control pH of the PLS for maximizing the amount of metals precipitated from the PLS. In one embodiment, a device using a voltametric sensor is used to control and regulate the pH of the PLS.

Separating/Recovering Precipitate of Mo and Ni Metal Complexes: After precipitation, the solid precipitate is separate from solution by known means including settling, filtration, decantation, centrifugation etc., or combinations thereof.

In one embodiment, following solid-liquid separation, over 99% of the incoming molybdenum and over 98% of the incoming nickel are recovered in the unwashed precipitate 41.

In another embodiment, over 98% of the incoming molybdenum and over 90% of the nickel is recovered in the unwashed precipitate 41.

In one embodiment, the unwashed precipitate 41 contains 25-50 wt % Mo, 2 to 10 wt % Ni, less than 0.5 wt % V, less than 30 wt % AmSul, 1 to 10 wt % S, with a Mo to Ni ratio ranging from 5:1 to 25:1. In yet another embodiment, the unwashed precipitate 41 contains up to 35 wt % Mo, 6 wt % Ni, less than 0.05 wt % V and about 28 wt % in Amsul, has a light greenish blue color and is soluble in warm ammoniacal solution.

In one embodiment, after liquid-solid separation, the cooled precipitate 41 is optionally doubled washed with acidic water (not shown in FIG. 1) at ambient temperature having a pH in the range of 2-3.5 to remove adhering Amsul (ammonium sulfate) that may be entrained in the Mo—Ni precipitate. A portion of the wash water may be recycled to the leaching step as feed to the autoclave. The remaining wash water may be added to the supernatant (filtrate) 42 for additional precipitation and recovery of the residual Mo and Ni in the filtrate.

The solid precipitate 41, containing recovered metals, in one embodiment can be routed to a catalyst synthesis operation for the preparation of fresh catalysts. In another embodiment, the solid precipitate 41 undergoes further processing, for separating nickel from other metals by acid dissolution, filtration & solvent extraction.

The supernatant 42 recovered from the separation step is substantially free of Group VIB and Group VIII base metals. In one embodiment, substantially free means that the supernatant 42 recovered from the separation step contains 0.1 to 3% of the Group VIB metal in the feed, 1 to 20% of the Group VB metal in the feed, and 1 to 35% of the Group VIII metal in the feed for metal recovery. In another embodiment, the supernatant 42 is primarily Amsul, with small amounts of molybdenum, vanadium, and nickel. In one embodiment, the supernatant 42 contains 0.1 to 2% of the incoming molybdenum, 1 to 15% of the incoming vanadium, and 1 to 30% of the incoming nickel. In another embodiment, the supernatant 42 contains from 0.1 to 1% of the incoming molybdenum, 1 to 10% of the incoming vanadium, and 1 to 15% of the incoming nickel.

Optional Sulfide Precipitation of Residual Mo and Ni: In one embodiment, the pH of the Amsul supernatant 42 (plus optional wash water from washing the precipitate) is adjusted to further precipitate the small amount of metals left in the Amsul filtrate as metal sulfides. In one embodiment, the pH is adjusted to precipitate at least 95% of the Group VIB metal and at least 95% of the Group VIII metal initially present in the supernatant 42 prior to the precipitation.

In one embodiment, the pH is maintained at a level between 5 and 7 at a temperature of 60 to 95° C., in the presence of $H_2S$, following which a precipitate of Mo, Ni, and any V sulfides is obtained. In another embodiment with cobalt being used as a promoter group VIII metal, as cobalt precipitation increases with increasingly alkaline solution pH, the pH is adjusted upward to 12 to precipitate more than 95% of the cobalt left in the Amsul supernatant.

In one embodiment, a water soluble sulfide-containing compound 51, e.g., a water soluble sulfide, a water soluble polysulfide, or mixtures thereof, is added to the Amsul supernatant 42 (and recycled wash water, if any) with pH adjustment, thus precipitating the small amount of metals dissolved therein. In one embodiment, the precipitation is carried out at a pressure from atmospheric to 100 psig and at a temperature ranging from 50 to 95° C. In yet another embodiment, ammonia is optionally added to the supernatant (filtrate) 42 to bring the solution pH to 7 prior to the addition of the water soluble sulfide containing compound.

In one embodiment, the water soluble sulfide-containing compound is selected from the group of hydrogen sulfide, ammonium sulfide, NaHS, or $Na_2S$, or mixtures thereof. In another embodiment, hydrogen sulfide is used in an amount of about 0.05 to 0.2 molar to precipitate out nickel, molybdenum, cobalt, and the like from the filtrate 42.

Optional Separation/Recovering Residual Mo and Ni Metal Sulfides: In the event that a (second optional) precipitation step (via sulfidation) is employed to further recover Ni and Mo from the supernatant (filtrate) 42 from separator 40, the metal sulfide slurry stream from precipitator 50 is sent to a separator (60). In this step, the solid precipitate containing residual metal sulfides is separated from the ammonium sulfate (Amsul) solution by known means including settling, filtration, decantation, centrifugation, etc., or combinations thereof.

In one embodiment, a filter press (not shown in FIG. 1) is used to separate the metal sulfide precipitates 62 from the ammonium sulfate solution 61. The solids 62, containing precipitated metal sulfides, are sent to a holding tank for subsequent metals recovery through the autoclave. In another embodiment, the solids 62, containing precipitated metal sulfides, are sent to a holding tank for off-site disposal to metals reclaimers.

The supernatant 61 recovered from this step is substantially free of Group VB, Group VIB and Group VIII metals, e.g., V, Mo and Ni. In one embodiment, substantially free means a removal rate of at least 90% for Group VB metals such as vanadium, and at least 95% for the Group VIB and Group VIII metals in the feed, e.g., molybdenum and nickel. In one embodiment, analysis of the ammonium sulfate solution 61 shows a concentration of 300 to 800 gpL Amsul, less than 100 ppm of the group VIB metals, less than 20 ppm of the Group VIII metals, and less than 100 ppm of the Group VB metals. In a second embodiment, the supernatant (ammonium sulfate solution) 61 has a concentration of 200 to 600 gpL Amsul, less than 50 ppm Mo, less than 10 ppm Ni, and less than 50 ppm V. In a third embodiment, the solution 61 contains 100 to 1000 gpL ammonium sulfate, less than 100 ppm molybdenum, less than 20 ppm nickel, and less than 100 ppm vanadium.

Ammonium sulfate can be recovered from stream 61 using methods known in the art. In one embodiment, the recovered ammonium sulfate is recycled for use as fertilizers.

Figure 2:
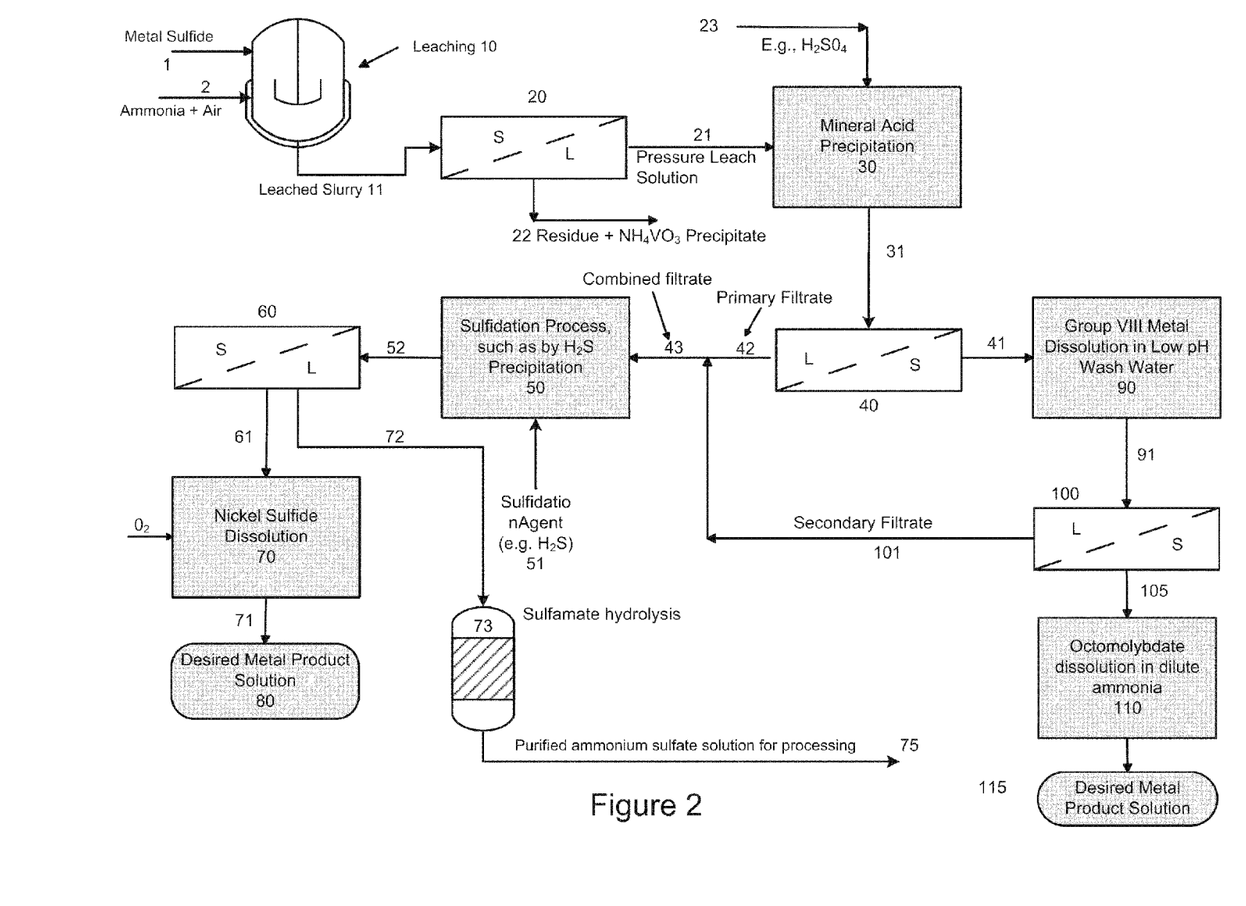
FIG. 2 is an overview of another embodiment of the process.

With reference now to FIG. 2, after precipitation, the solid precipitate 31 is separated from solution by known means 40 including settling, filtration, decantation, centrifugation etc., or combinations thereof, which in one embodiment generates a primary filtrate 42 comprising low concentrations of Group VB (if any), Group VIB and Group VIII metals and a secondary solid residue 41 comprising Group VB (if any), Group VIB and Group VIII metal complexes, which is transferred to the vessel 90 for further separation.

In one embodiment, following solid-liquid separation (40), over 99% of the incoming molybdenum and over 90% of the incoming nickel are recovered in the unwashed precipitate 41. In another embodiment, over 98% of the incoming molybdenum and over 70% of the nickel is recovered in the unwashed precipitate 41.

In one embodiment, the unwashed precipitate 41 contains 25-50 wt % Mo, 2 to 10 wt % Ni, less than 0.5 wt % V, less than 35 wt % AmSul, 1 to 10 wt % S, with a Mo to Ni ratio ranging from 2.5:1 to 25:1. In yet another embodiment, the unwashed precipitate 41 contains up to 35 wt % Mo, 6 wt %

Ni, less than 0.05 wt % V and up-to 30 wt % in Amsul, has a light greenish blue color and is soluble in hot ammoniacal solution.

In one embodiment, after liquid-solid separation, the cooled precipitate 41 is optionally washed with acidic water having a pH in the range of 2-3.5 (not shown in FIG. 2) at ambient temperature to remove adhering Amsul (ammonium sulfate) that may be entrained in the Mo—Ni precipitate. A portion of the wash water may be recycled to the leaching step as feed to the autoclave. The remaining wash water may be added to the primary filtrate 42 for additional precipitation and recovery of the residual Mo and Ni in the filtrate.

The solid precipitate 41, containing recovered metals, in one embodiment can be routed to a catalyst synthesis operation for the preparation of fresh catalysts. In another embodiment for use in hydroprocessing, the solid precipitate 41 undergoes further processing, for separating nickel from other metals by acid dissolution, filtration & solvent extraction. In one embodiment, the filtered solids 41 comprises of ammonium octamolybdate and a double salt of nickel ammonium sulfate can be stirred in hot, acidified water for a sufficient time to enable dissolution of the double salt of nickel from the ammonium octamolybdate. In a further embodiment, a mixture of the double salt of nickel and the precipitated ammonium octamolybdate is separated by suitable means 100 to recover as a secondary filtrate 101 a solution of nickel sulfate and ammonium sulfate and the ammonium octamolybdate precipitate 105. In one embodiment, nickel, vanadium and ammonium sulfate levels are up-to 1.0 wt %, 0.10 wt % and 10 wt %, respectively in the secondary filtrate 101. In yet another embodiment (not shown), after a displacement wash of the octamolybdate solids 105 with fresh water, the nickel, vanadium and ammonium sulfate levels are lowered in the filtrate to up to 0.5 wt %, 0.05 wt % and 5 wt %, respectively prior to combining with the secondary filtrate 101. In another embodiment the octamolybdate solids 105, after at least one displacement wash exhibits 59.8% molybdenum, 0.05% nickel, 0.17% vanadium and 0.2% ammonium sulfate. In another embodiment, the octamolybdate solids are redissolved in dilute ammonia at a temperature ranging from 50° C. to 75° C. to yield an ammonium molybdate product solution 115 for effective separation of molybdenum from the nickel and other metals.

The primary filtrate 42 recovered from the separation step 40 is substantially free of Group VB, VIB and Group VIII base metals. In one embodiment, substantially free means that the primary filtrate 42 recovered from the separation step contains 0.1 to 3% of the Group VIB metal in the feed, 1 to 20% of the Group VB metal, and 1 to 35% of the Group VIII metal for metal recovery. In another embodiment, the primary filtrate 42 is primarily Amsul, with small amounts of molybdenum, vanadium, and nickel. In one embodiment, the primary filtrate 42 contains 0.1 to 2% of the incoming molybdenum, 1 to 15% of the incoming vanadium, and 1 to 30% of the incoming nickel. In another embodiment, the primary filtrate 42 contains from 0.1 to 1% of the incoming molybdenum, 1 to 10% of the incoming vanadium, and 1 to 15% of the incoming nickel. In one embodiment, primary filtrate 42 and the secondary filtrate 101 are mixed to form a combined filtrate 43 and transferred to a reactor 50 for precipitation of soluble metals using sulfidation.

Sulfide Precipitation of Residual Mo, Ni and V: In one embodiment, the pH of the combined filtrate 43 (plus optional wash water from washing the octamolybdate precipitate 105) is adjusted to further precipitate as metal sulfides the metals remaining in the Amsul filtrate. In one embodiment, the sulfidation pH is adjusted to precipitate at least 95% of the Group VIB metal and at least 95% of the Group VIII metal that were initially present in the combined filtrate 43 prior to the precipitation.

In one embodiment, the pH is maintained at a level between 7.5 and 9 in the presence of $H_2S$ gas at an overpressure between 100 and 200 kPa and temperature between 50 and 150° C. for at least one hour to obtain a precipitate of Mo, Ni sulfides, and V oxy-hydroxides. In another embodiment with cobalt being used as a promoter group VIII metal, as cobalt precipitation increases with increasingly alkaline solution pH, the pH is adjusted upward to 12 to precipitate more than 95% of the cobalt left in the combined filtrate.

In one embodiment, a water soluble sulfide-containing compound 51, e.g., a water soluble sulfide, a water soluble polysulfide, or mixtures thereof, is added to the combined filtrate 43 (and recycled wash water, if any) with pH adjustment, thus precipitating the metals dissolved therein. In one embodiment, the precipitation is carried out at a pressure from atmospheric to 100 psig and at a temperature ranging from 60° C. to 110° C. In yet another embodiment, ammonia is optionally added to the combined filtrate 43 to bring the solution pH to about 8 prior to the addition of the water soluble sulfide containing compound 51.

In one embodiment, the water soluble sulfide-containing compound is selected from the group of hydrogen sulfide, ammonium sulfide, NaHS, or $Na_2S$, or mixtures thereof. In another embodiment, sufficient hydrogen sulfide is ensured in the system by continuously maintaining an ammoniacal pH of up-to 9 to precipitate out nickel, molybdenum, cobalt, and the like from the combined filtrate 43.

Sulfide Oxidation and Dissolution: The ammonium sulfate slurry, containing Mo, Ni sulfides, and V oxy-hydroxides, is subjected to a solid-liquid separation step 60 and the resultant solids 62 comprising primarily nickel sulfide is transferred to a pressure leaching reactor 70, wherein the pH of the residue is adjusted to a range between 4.5 and 5.5 and is pressure leached in the presence of oxygen at a temperature between 160° C. and 170° C. at a total pressure ranging from 1000 to 1200 kPa for about one hour. In step 60, the solids containing residual metal sulfides and oxides are separated from the ammonium sulfate (Amsul) solution by known means including settling, filtration, decantation, centrifugation, etc., or combinations thereof. In another manifestation of this process, nickel sulfide solids are converted to a highly concentrated nickel sulfate solution having a pH of less than 1, a desired metal product solution 80. In one embodiment the conversion of nickel sulfide to nickel sulfate is in excess of 90%, in another embodiment conversion is in excess of 95% and in another embodiment conversion is about 99%.

The filtrate 72 recovered from this step is substantially free of Group VB, Group VIB and Group VIII metals, e.g., V, Mo and Ni. In one embodiment, substantially free means a removal rate of at least 90% for Group VB metals such as vanadium, and at least 95% for the Group VIB and Group VIII metals, e.g., molybdenum and nickel. In one embodiment, analysis of the ammonium sulfate stream 72, shows a concentration of 300 to 800 gpL Amsul, less than 100 ppm of the group VIB metals, less than 20 ppm of the Group VIII metals, less than 100 ppm of the Group VB metals and 30 to 80 gpL sulfamate (a herbicide). In a second embodiment, the filtrate (ammonium sulfate solution) 72 has a concentration of 200 to 600 gpL Amsul, less than 50 ppm Mo, less than 10 ppm Ni, less than 50 ppm V and 20 to 60 gpL sulfamate. In a third embodiment, the filtrate 72 contains 100 to 1000 gpL ammonium sulfate, less than 100 ppm molybdenum, less than 20 ppm nickel, less than 100 ppm vanadium and 10 to 100 gpL sulfamate.

In another embodiment, a clarified ammonium sulfate effluent 72 is transferred to a reactor 73 and further subjected to sulfamate destruction by hydrolysis in the presence of steam at a temperature ranging between 210 and 250° C., a pressure ranging from 2000 kPa two 4000 kPa and a retention time of between 0.5-hours each such and 1.5-hours to produce a purified ammonium sulfate solution product 75 suitable for further processing, such as for fertilizer.

In one embodiment, a filter press or other suitable means for separation is used to separate the metal sulfide precipitate 62 from the ammonium sulfate solution 72. The solids 62, containing precipitated metal sulfide and oxides, are optionally sent to a holding tank (not shown in FIG. 2) for subsequent metals recovery through the autoclave. In another embodiment, the solids 62, containing precipitated metal sulfides, are optionally sent to a holding tank (not shown in FIG. 2) for off-site disposal to metals reclaimers.

Figure 3:
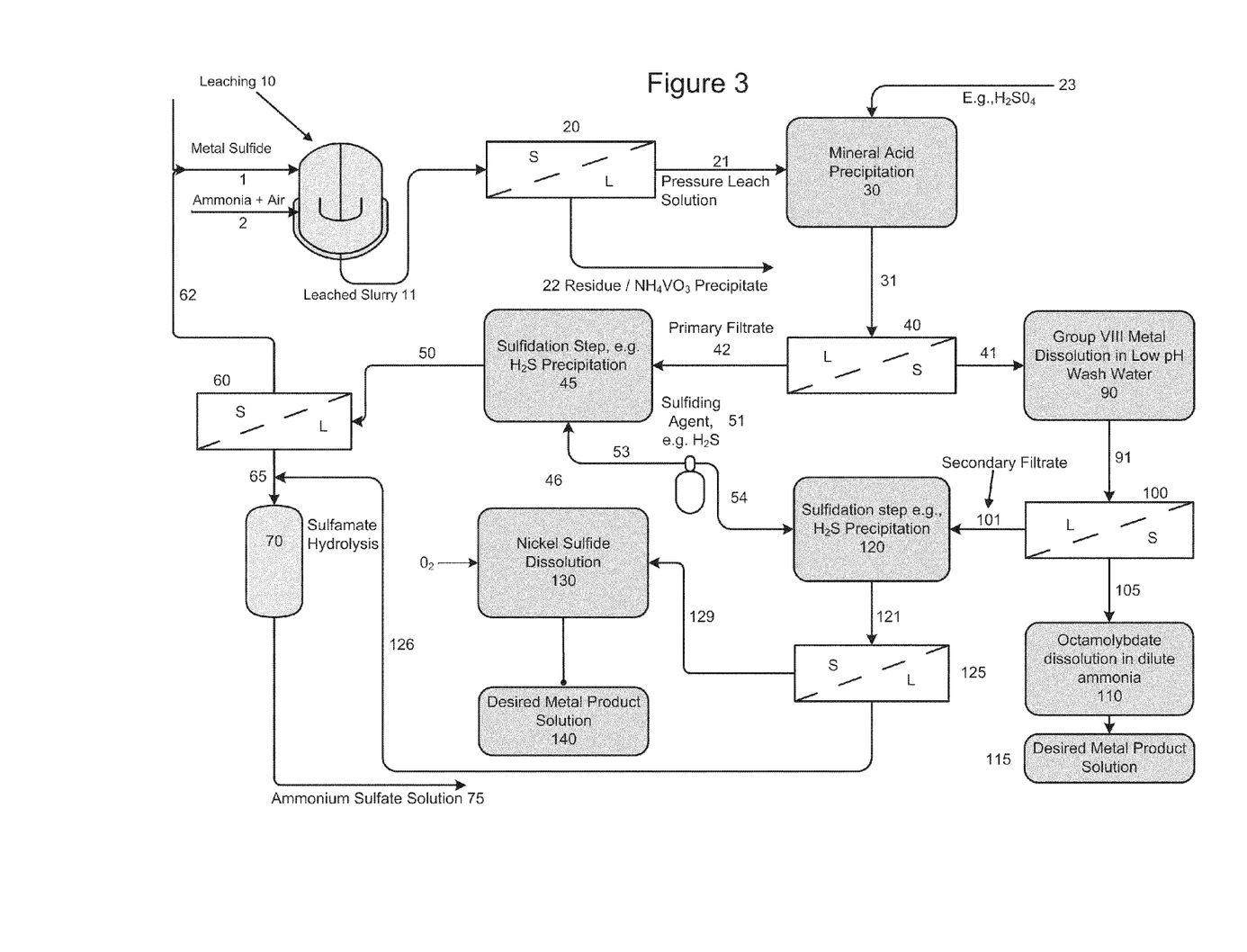
FIG. 3 is an overview of a further embodiment of the process of the invention showing individual metal separation and recovery stages.

With reference now to FIG. 3, the primary filtrate 42 recovered from the separation step 40 is substantially free of Group VIB and Group VIII base metals. In one embodiment, substantially free means that the primary filtrate 42 recovered from the separation step 40 contains 0.1 to 3% of the Group VIB metal in the feed, 1 to 20% of the Group VB metal in the feed, and 1 to 35% of the Group VIII metal in the feed for metal recovery. In another embodiment, the primary filtrate 42 is primarily Amsul, with small amounts of molybdenum, vanadium, and nickel. In one embodiment, the primary filtrate 42 contains 0.1 to 2% of the incoming molybdenum, 1 to 15% of the incoming vanadium, and 1 to 30% of the incoming nickel. In another embodiment, the primary filtrate 42 contains from 0.1 to 1% of the incoming molybdenum, 1 to 10% of the incoming vanadium, and 1 to 15% of the incoming nickel.

In one form of the invention, a secondary filtrate 101 comprises primarily the double salt of nickel and Amsul and trace amounts of residual molybdenum and vanadium soluble complexes.

Sulfide Precipitation of Residual Mo and Ni: Sulfide precipitation of the primary filtrate and/or the secondary filtrate can be carried out, optionally, in any one or a combination of several embodiments of the invention. In one embodiment, the primary filtrate 42 is subjected to a primary sulfide precipitation method 50 and in another embodiment the secondary filtrate 101 is subjected to a secondary sulfide precipitation method 120. In one embodiment, the pH of the primary filtrate 42 (plus optional wash water from washing the precipitate) is adjusted to further precipitate as metal sulfides the metals remaining in the Amsul filtrate. In one embodiment, the pH in precipitation method 45 is adjusted to precipitate at least 95% of the Group VIB metal and at least 95% of the Group VIII metal initially present in the primary filtrate 42 prior to the precipitation.

In one embodiment of the primary precipitation method, which is carried out in multiple reactors designated as vessel 50, the pH is adjusted multiple times, from acidic-to-basic-to-acidic-to-basic, in the presence of $H_2S$ gas and diammonium hydrogen phosphate at 100 kPa $H_2S$ gas overpressure and a temperature of 100° C. for at least 90 minutes to obtain a precipitate of Mo, Ni, and V sulfides and oxy-hydroxides. In one manifestation of this embodiment, the primary precipitation method forms a mixture 52, comprising a primary liquid fraction and a primary solid residue, respectively, with the primary liquid fraction comprising very low concentrations of molybdenum, nickel and vanadium and primarily ammonium sulfate solution. In one embodiment, the primary solid residue and primary liquid fraction 52 are separated into their respective fractions in separator 60. In this embodiment the primary liquid fraction 65 is transferred to vessel 70, mixed with the secondary liquid fraction 126 to form a combined solution that in one embodiment is subject to oxydrolysis or sulfamate hydrolysis and soluble sulfide oxidation to form, in one embodiment, a purified ammonium sulfate solution 75.

In one embodiment, a water soluble sulfide-containing compound 51, e.g., a water soluble sulfide, a water soluble polysulfide, or mixtures thereof, is added to either one or both of the primary filtrate 42 and the secondary filtrate 101 (and recycled wash water, if any) with pH adjustment, thus precipitating the metals dissolved therein. In one embodiment, the primary filtrate 42 comprises low soluble nickel at less than 500 ppm and a combined concentration of molybdenum and vanadium at less than 1000 ppm and high ammonium sulfate content, in one embodiment from about 420 gpL to 470 gpL and in another embodiment about 450 gpL. In one embodiment the pH of the primary filtrate 42 is adjusted to range between 7.5 and 8.5 by the addition of ammonia prior to sulfidation and in another embodiment a salt of di-ammonium hydrogen phosphate (DAHP) is added prior to sulfidation. In one embodiment the primary precipitation method is carried out at a $H_2S$ overpressure from 100-kPa to 500-kPa and at a temperature ranging from 60° C. to 110° C. In this embodiment, the ammoniacal primary filtrate 42 is sulfided for up-to 30 minutes followed by acidification to a pH between 1.5 and 2.5 and sulfidation for up-to an additional 30-minutes followed by addition of ammonia, to increase the pH to up-to 8, and sulfidation for up-to an additional 30 minutes.

In another embodiment the secondary filtrate 101 comprising primarily the double salt of nickel sulfate, ammonium sulfate and trace amounts of soluble molybdenum and vanadium complexes is transferred to a sulfidation vessel 120 and subjected to a sulfide precipitation reaction in the presence of $H_2S$ gas, at a gas overpressure ranging from 100 kPa to 500 kPa, a temperature ranging from 90° C. to 110° C. at a pH ranging from 7.5 to 9.5 for about 30 minutes to 90 minutes to form a mixture 121 comprising the secondary liquid fraction 126 and a precipitate comprising the secondary solid residue 129. In another embodiment, the sulfidation reaction is carried in vessel 120 at a pressure of 100 kPa, a temperature of 100° C. and a pH ranging between 8 and 9 for 60 minutes. In at least this embodiment the mixture 121 is passed to separator 125 to obtain the secondary solid residue 129 and the secondary liquid fraction 126. In this embodiment, the secondary solid residue containing residual metal sulfides is separated from the ammonium sulfate (Amsul) solution by known means including settling, filtration, decantation, centrifugation, etc., or combinations thereof. In yet another embodiment, the secondary solid residue 129 comprising primarily of nickel sulfide is transferred to a pressure leaching reactor 130, wherein the pH of the residue is adjusted to a range between 4.5 and 5.5 and is pressure leached in the presence of oxygen at a temperature between 160° C. and 170° C. at a total pressure ranging from 1000 to 1200 kPa for up to two hours. In another manifestation of this process nickel sulfide solids are converted to a concentrated nickel sulfate solution having a pH of less than 1, a desired product solution 140. In one embodiment the conversion of nickel sulfide to nickel sulfate is in excess of 90%, in another embodiment conversion is in excess of 95% and in another embodiment conversion is about 99%.

The primary liquid fraction 65 recovered from one embodiment of the primary sulfide precipitation method is substantially free of Group VB, Group VIB and Group VIII metals, e.g., V, Mo and Ni. In one embodiment, substantially free means a removal rate of at least 90% for Group VB metals such as vanadium, and at least 95% for the Group VIB and Group VIII metals in the catalyst, e.g., molybdenum and nickel. In one embodiment, analysis of the primary liquid fraction 65, an ammonium sulfate solution, shows a concentration of 300 to 800 gpL Amsul, less than 100 ppm of the group VIB metals, less than 20 ppm of the Group VIII metals, less than 100 ppm of the Group VB metals, less than 500 ppm residual phosphorus and 20 to 80 gpL ammonium sulfamate (a herbicide). In a second embodiment, the primary liquid fraction (ammonium sulfate solution) 65 has a concentration of 200 to 600 gpL Amsul, less than 50 ppm Mo, less than 10 ppm Ni, and less than 50 ppm V, less than 300 ppm residual phosphorus and 10 to 60 gpL ammonium sulfamate. In a third embodiment, the primary liquid fraction 65 contains 100 to 1000 gpL ammonium sulfate, less than 100 ppm molybdenum, less than 10 ppm nickel, and less than 100 ppm vanadium, less than 400 ppm residual phosphorus and 5 to 100 gpL ammonium sulfamate.

In one embodiment, the water soluble sulfide-containing compound 51 is selected from the group of hydrogen sulfide, ammonium sulfide, NaHS, or $Na_2S$, or mixtures thereof. In another embodiment, hydrogen sulfide is used in an amount of about 0.05 to 0.2 molar to precipitate out nickel, molybdenum, cobalt, and the like from either one or both of the primary filtrate 42 and the secondary filtrate 101.

In another embodiment, the secondary liquid fraction 126 is combined with the primary liquid fraction 65 prior to oxydrolysis in vessel 70 and is subjected to sulfamate destruction by hydrolysis and soluble sulfide oxidation in the presence of steam at a temperature ranging between 210 and 250° C., a pressure ranging from 2,000 kPa to 4,000 kPa and a retention time of between 0.5-hour and 1.5-hour to produce a purified ammonium sulfate product 75 suitable for further processing, such as for fertilizer.

In one embodiment, a filter press or other suitable means of separation 60 is used to separate the metal sulfide precipitates 62 from the ammonium sulfate solution 65. In one embodiment the primary solid residue 62 is transferred directly to the metal sulfide feed 1 for additional leaching in autoclave 10 or transferred to other processes for metals reclamation. Alternatively, in another embodiment, the solids 62, containing precipitated metal sulfides, are sent to a holding tank or surge tank (not shown in FIG. 1) for subsequent metals recovery through the autoclave 10. In another embodiment, the solids 62, containing precipitated metal sulfides, are sent to a holding tank for off-site disposal or metals reclamation.

EXAMPLES

The following illustrative examples are intended to be non-limiting.

Example 1

In this example, a PLS (deep blue color) stream with a pH of 9.2 was adjusted to 3.0 by single stage concentrated sulfuric acid (96%) addition. The PLS composition included 33 gpL free $NH_3$, 80.9 gpL Mo, 7.9 gpL Ni, 0.17 gpL V and 277 gpL ammonium sulfate (Amsul). After mixing for about 2-hours at a temperature of 70° C., about 99% of the molybdenum precipitates out as a molybdenum compound. Approximately 98% of the residual Ni also precipitates out with the molybdenum. It is believed that the compound is a mixture of ammonium octamolybdate and nickel ammonium sulfate.

The slurry is cooled to ambient and filtered to remove the precipitate. The precipitate is optionally double-washed with pH 3.0 water at ambient temperature to remove entrained ammonium sulfate. During the washing step, an additional 23% of Ni re-solubilizes to achieve a final Ni recovery of about 75%. Minimal re-solubilization of Mo occurs. The final solution (including wash) analyzes 0.53 gpL Mo, 1.49 gpL Ni, and 0.08 gpL V, for a metal precipitation efficiency of 99.2% Mo, 76.4% Ni, and 27.9% V.

The precipitate, appearing as light greenish with blue tinges, is soluble in warm ammoniacal solution. An analysis of the washed precipitated solids reveals a moisture of 34.2 wt %, 42.6 wt % Mo (dry basis), 3.17 wt % Ni (dry basis), minimal V (less than 0.02 wt %), 6.8 wt % Amsul, 3.4 wt % S and a Mo/Ni ratio of 13.4.

In the next step, a portion of the wash water is recycled to the autoclave feed. The remaining wash water and filtrate, which is primarily ammonium sulfate (Amsul), contain low levels of Mo & V together with moderate amounts of Ni. The solution pH is increased to about 7 with ammonia addition followed by sulfidation with $H_2S$ gas under pressure at 200-kPa (30-psi) for 2-hours. The pH is maintained between 6 and 7 at a temperature of 80° C. following which a precipitate of Mo, Ni and V sulfides is obtained. The slurry undergoes liquid-solid separation and the Amsul stream is further processed for recovering ammonium sulfate for use as fertilizer. Analysis of the final Amsul stream depicts 440 gpL Amsul, with 45 ppm Mo, less than 5 ppm Ni, and 26 ppm V.

Following precipitation, filtering and washing of the sulfided solids, the cake containing recovered metal sulfides is stored in a tank as autoclave feed inventory. It can also be sent for off-site disposal to metals reclaimers.

Example 2

Example 1 is repeated with a PLS stream having a pH of 10.6, containing 53 gpL free $NH_3$, 85 gpL Mo, 8.24 gpL Ni, 0.40 gpL V and 271 gpL ammonium sulfate (Amsul). The PLS stream pH is adjusted to 2.71. The final solution (including wash) shows 0.48 gpL Mo, 1.44 gpL Ni, and 0.08 gpL V, for a metal precipitation efficiency of 99.2% Mo, 77.3% Ni, and 75% V. The washed precipitated solids show a moisture of 25.9 wt %, 41.8 wt % Mo (dry basis), 3.37 wt % Ni (dry basis), 0.16 wt % V, 3.8 wt % AmSul, 2.76 wt % S and a Mo/Ni ratio of 12.4.

After sulfidation, the final Amsul stream concentration reveals 500 gpL Amsul, with 41 ppm Mo, less than 5 ppm Ni, and 26 ppm V.

Example 3

In this example 3, Example 1 is substantially replicated (although example number two could be substituted) as set out in paragraphs 063-066 with the addition, however, of separate liquid-solid separation and sulfidation steps as follows: A PLS stream with a pH of 9.2 was adjusted to 3.0 by single stage addition of concentrated sulfuric acid (96 wt %) addition. The PLS composition included 33 gpL free $NH_3$, 80.9 gpL Mo, 7.9 gpL Ni, 0.17 gpL V and 277 gpL ammonium sulfate (Amsul). After mixing for about 2-hours at a temperature of 80° C., about 99% of the molybdenum precipitated out as a molybdenum compound. Approximately 98% of the residual Ni also precipitated out with the molybdenum resulting in a slurry comprising of ammonium octamolybdate and a double salt of nickel ammonium sulfate; following liquid-solid separation of the cooled slurry, a primary filtrate material containing low levels of molybdenum, nickel and vanadium.

The molybdate/and nickel precipitate is soluble in hot ammoniacal solution. An analysis of the washed precipitated solids reveals a moisture content of 34.2 wt %, metals content on a dry basis of 42.6 wt % Mo, 3.17 wt % Ni, minimal V (less than 0.02 wt %), 6.8 wt % Amsul, 3.4 wt % S and a Mo/Ni ratio of 13.4. To obtain a purified molybdate product solution the residue was repulped at 25 wt % solids in hot (80° C.) pH 2 acidified water for 30-minutes enabling dissolution of the double salt of nickel from the ammonium octamolybdate solids as per the following reaction:

$$NiSO_4 \cdot (NH_4)_2SO_4 \cdot 6H_2O(s) \rightarrow 6H_2O(aq) + NiSO_4(aq) + (NH_4)_2SO_4(aq) \quad (1)$$

The resulting mixture was filtered to separate the undissolved octamolybdate solids from the nickel and ammonium sulfate solution comprising the secondary filtrate. Table 1 shows Ni, V and ammonium sulfate levels of 0.36 wt %, 0.16 wt % and 4 wt % respectively in the repulped and filtered octamolybdate cake. A displacement wash of the solids with fresh water lowered Ni, V and ammonium sulfate levels to 0.05 wt %, 0.17 wt % and 0.2 wt % respectively in the octamolybdate cake. During the washing step, greater than 99% of Ni and Amsul re-dissolved from the cake. Minimal re-dissolution of Mo and V occurred from the octamolybdate cake.

The octamolybdate solids are re-dissolved in hot, dilute ammonia to yield ammonium molybdate product as per the following reaction:

$$(NH_4)_4Mo_8O_{26} \cdot 5H_2O(s) + 12NH_3(aq) \rightarrow H_2O(aq) \rightarrow 8(NH_4)_2MoO_4(aq) \quad (2)$$

The primary filtrate from the initial step, which is acidic and contains low soluble Mo, Ni & V values and high ammonium sulfate content and the secondary filtrate of nickel and ammonium sulfate solution, which is also acidic and contains low soluble Mo & V and high Ni and ammonium sulfate content, were subjected to separate sulfidation processes to ensure elimination of metal values from the desired ammonium sulfate product solution. Regarding the primary filtrate, Table 2 presents batch results from several tests on semi-synthetic solutions or pilot plant sulfided effluent, partially depleted of metals content and made up with synthetic metals to represent the primary filtrate. The data show that the precipitate of Ni as NiS did not undergo significant re-solubilization at both acidic and ammoniacal ranges. Test 1, as shown in Table 2, indicates that continuous sulfidation of the primary filtrate, at neutral to ammoniacal pH, does not lower Mo & V values to acceptable concentrations in the Amsul effluent.

TABLE 1

Repulp-Displacement Wash Data for Separating Ni & Amsul from Octamolybdate Solids

| Mo | Ni | V | Ammonium Sulfate |
|---|---|---|---|
| Unwashed solids from Mo—Ni Precipitation from PLS (wt %) | | | |
| 35 | 3.5 | 0.1 | 24 |
| Mo—Ni Solids Repulping @ 25 wt % solids & pH 2 water @ 80° C. - Filtrate Analyses | | | |
| 0.25 | 3.5 | 0.014 | 88 |
| Mo—Ni Solids Repulping @ 25 wt % solids & pH 2 water @ 80° C. - Solid Analyses | | | |
| 55.6 | 0.36 | 0.16 | 4 |
| Repulped Cake Displacement Wash, pH 2, water @ 60° C., L:S ratio 1.6:1 - Wash Water Analyses | | | |
| 2.1 | 4.7 | 0.01 | 45 |
| Repulped Cake Displacement Wash, pH 2, water @ 60° C., L:S ratio 1.6:1 - Solid Analyses | | | |
| 59.8 | 0.05 | 0.17 | 0.2 |

TABLE 2

Sulfidation of Ammonium Sulfate (450 gpL) solutions containing - 1000 ppm Mo, Ni & V - Addition of DAHP

| Test # | Feed Type | H$_2$S O.P. Kpa | Temp. °C. | DAHP as P ppm | Time min. | pH | Ni ppm | V ppm | Mo ppm | Final Total Metals ppm | Residual P ppm |
|---|---|---|---|---|---|---|---|---|---|---|---|
| 1 | Semi Synthetic Solution | 100 (14.5 Psi) | 100 | 0 | 0 | 6.7 | 340.0 | 150.0 | 578.0 | 204.1 | 0 |
| | | | | | 40 | 6.6 | 0.3 | 131.2 | 76.2 | | 0 |
| | | | | | 60 | 8.0 | 0.4 | 130.0 | 72.6 | | 0 |
| | | | | | 80 | 8.1 | 0.7 | 130.4 | 73.0 | | 0 |
| 2 | Semi Synthetic Solution | 100 (14.5 Psi) | 100 | 0 | 0 | 2.5 | 300.0 | 150.0 | 600.0 | 231.8 | 0 |
| | | | | | 40 | 2.4 | 264.0 | 149.0 | 50.0 | | 0 |
| | | | | | 60 | 8.0 | 2.3 | 117.0 | 130.0 | | 0 |
| | | | | | 80 | 8.3 | 1.8 | 111.0 | 119.0 | | 0 |
| 3 | Semi Synthetic Solution | 100 (14.5 Psi) | 100 | 0 | 0 | 8.5 | 320.0 | 150.0 | 560.0 | 75.5 | 0 |
| | | | | | 40 | 2.1 | 2.3 | 129.6 | 0.8 | | 0 |
| | | | | | 60 | 8.4 | 4.2 | 105.0 | 19.9 | | 0 |
| | | | | | 80 | 8.4 | 4.4 | 57.7 | 13.4 | | 0 |
| 4 | Semi Synthetic Solution | 100 (14.5 Psi) | 100 | 7000 | 0 | 3.1 | 292.0 | 150.0 | 495.0 | 53.7 | 7000 |
| | | | | | 40 | 2.8 | 1.4 | 13.4 | 4.6 | | 6572 |
| | | | | | 60 | 8.3 | 0.9 | 4.9 | 45.3 | | 5310 |
| | | | | | 80 | 8.2 | 1.0 | 5.4 | 47.3 | | 5270 |
| 5 | Semi Synthetic Solution | 100 (14.5 Psi) | 100 | 1500 | 0 | 6.5 | 300.0 | 150.0 | 536.0 | 16.9 | 1322 |
| | | | | | 40 | 2.2 | 1.0 | 152.0 | 0.8 | | 1368 |
| | | | | | 60 | 8.6 | 0.5 | 5.5 | 5.7 | | 940 |
| | | | | | 80 | 8.5 | 0.9 | 6.4 | 9.6 | | 940 |
| 6 | Semi Synthetic Solution | 100 (14.5 Psi) | 100 | 1500 | 0 | 7.8 | 300.0 | 150.0 | 514.0 | 13.5 | 1473 |
| | | | | | 40 | 2.0 | 1.1 | 131.4 | 1.4 | | 1356 |
| | | | | | 60 | 7.8 | 0.3 | 10.8 | 4.5 | | 1040 |
| | | | | | 80 | 8.2 | 0.3 | 7.5 | 5.7 | | 980 |

TABLE 2-continued

Sulfidation of Ammonium Sulfate (450 gpL) solutions
containing - 1000 ppm Mo, Ni & V - Addition of DAHP

| Test # | Feed Type | H₂S O.P. Kpa | Temp. °C. | DAHP as P ppm | Time min. | pH | Ni ppm | V ppm | Mo ppm | Final Total Metals ppm | Residual P ppm |
|---|---|---|---|---|---|---|---|---|---|---|---|
| 7 | Semi Synthetic Solution | 100 (14.5 Psi) | 100 | 340 | 0 | 7.6 | 254.0 | 150.0 | 444.0 | 8.5 | 340 |
|   |   |   |   |   | 40 | 2.0 | 1.2 | 143.0 | 1.4 |   | 394 |
|   |   |   |   |   | 60 | 7.0 | 0.1 | 2.3 | 2.1 |   | 250 |
|   |   |   |   |   | 80 | 8.1 | 0.1 | 6.5 | 1.9 |   | 250 |
| 8 | Semi Synthetic Solution | 100 (14.5 Psi) | 100 | 495 | 0 | 8.6 | 345.0 | 150.0 | 520.0 | 5.8 | 495 |
|   |   |   |   |   | 40 | 2.2 | 0.7 | 134.0 | <0.1 |   | 456 |
|   |   |   |   |   | 60 | 7.7 | <0.1 | 5.8 | <0.1 |   | 300 |
| 9 | Semi Synthetic Solution | 100 (14.5 Psi) | 100 | 261 | 0 | 8.5 | 345.0 | 150.0 | 520.0 | 4.9 | 261 |
|   |   |   |   |   | 40 | 2.2 | 0.2 | 92.4 | <0.1 |   | 261 |
|   |   |   |   |   | 60 | 7.5 | <1 | 4.9 | <0.1 |   | 170 |

Test 2, as shown in Table 2, shows that high Mo levels in the sulfided effluent were a result of not initially adjusting the acidic feed solution pH to the basic domain. Vanadium levels were untouched in this pH sequence zone. Test 3 demonstrates that Mo levels may be reduced in the sulfided effluent by adjusting the incoming solution pH during sulfidation from acidic-to-ammoniacal-to acidic and finally to the basic domain over 90 minutes. Vanadium levels remained high. Test 4 revealed that introduction of diammonium hydrogen phosphate (DAHP) lowered V to acceptable levels in the sulfided effluent. Although Mo levels were high as a result of not adjusting the initial acidic feed solution pH to within the ammoniacal region, metal values were significantly lower than Test 2 indicating positive synergies with phosphate addition.

Follow-up analyses (Table 2, Tests 5-9) indicated the following conditions were suitable for lowering Mo & V to acceptable levels in the Amsul stream. The primary acidic filtrate, containing less than 500 ppm nickel, less than 1000 ppm molybdenum and vanadium combined and a high ammonium sulfate content of at least 450 gpL, was adjusted to a pH of about 8.0 and mixed with less than 1,500 ppm of a salt of di-ammonium hydrogen phosphate (DAHP). The mixture was then sulfided with H₂S at a gas overpressure of 100 kPa and a temperature of 100° C. for 20 minutes. The pH of the solution was then adjusted to approximately 2.0 with sulfuric acid followed by additional sulfidation under the same conditions. A final pH adjustment to about 8.0 was made with dilute ammonia again followed by sulfidation for an additional 20 minutes under the same conditions. Under these conditions, the following molybdenum reaction chemistry is believed to occur:

From the initial acidic mode and with the injection of ammonia and H₂S at 100° C., Mo⁺⁶ soluble species are converted to the tetrathiomolybdate complex as per:

$$Mo^{+6}(aq)+2NH_3(aq))+4H_2S(g) \rightarrow (H_4)_2MoS_4(aq)+6H \quad (3)$$

Following readjustment of pH to the acidic range, the tetrathiomolybdate complex is converted into insoluble molybdenum trisulfide as per:

$$(NH_4)_2MoS_4(aq)+H_2SO_4(aq) \rightarrow MoS_3\downarrow '(NH_4)_2SO_4(aq)+H_2S(aq) \quad (4)$$

Some dissolution of the molybdenum trisulfide would be expected, and has been observed, on readjusting the acidic slurry pH to the ammoniacal end as per:

$$MoS_3(s)+H_2S+2NH_3 \rightarrow (NH_4)_2MoS_4(aq) \quad (5)$$

The phosphate (DAHP) could additionally precipitate solubilized Mo species as phosphomolybdate in the alkaline range as per the reaction:

$$12Mo^{+6}(aq)+HP_4^{2-}(aq)+3NH_3(aq)+36OH \rightarrow (NH_4)_3PO_4 \cdot 2MoO_3 \cdot 3H_2O\downarrow +34H^+ \quad (6)$$

Ammonium Phosphomolybdate)

The following vanadium reaction chemistry is thought to occur:

From the initial acidic mode and with the injection of ammonia and H₂S at 100° C., V⁺⁵ species partially forms the soluble tetrathiovanadate complex as per:

$$NH_4VO_3(aq)+4H_2S(aq)+2NH_3(aq) \rightarrow (H_4)_3VS_4(aq)+3H_2O(aq) \quad (7)$$

Following readjustment of pH to the acidic range, partial conversion of the tetrathiomolybdate complex to the insoluble vanadium pentasulfide is probable as per:

$$NH_4VO_3(aq)+4H_2S(aq)+2NH_3(aq) \rightarrow (H_4)_3VS_4(aq)+3H_2O(aq) \quad (8)$$

Following readjustment of pH to the acidic range, partial conversion of the tetrathiomolybdate complex to the insoluble vanadium pentasulfide is probable as per:

$$2(NH_4)_3VS_4(aq)+H_2SO_4(aq) \rightarrow V_2S_5\downarrow +3(NH_4)_2SO_4(aq)+H_2S(aq) \quad (9)$$

Additionally, at the acidic pH, V+5 species could be reduced to the blue soluble vanadyl sulfate complex as per:

$$2NH_4VO_3(aq)+H_2S(aq)+3H_2SO_4(aq) \rightarrow V_2O_2(SO_4)_2(aq)(NH_4)_2(SO_4)(aq)+S°\downarrow 4H_2O \quad (10)$$

and/or precipitation of V (IV) oxide as per:

$$2NH_4VO_3(aq)+H_2S(aq) \rightarrow V_2O_4(s)+2NH_3(aq)+S°\downarrow +2H_2O(aq) \quad (11)$$

On readjusting the acidic slurry pH to the ammoniacal end, some precipitation is expected to occur as dark grey colored hypovanadic acid as per:

$$V_2O_2(SO_4)_2(aq)+4NH_3(aq)+4H_2O \rightarrow V_2O_2(OH)_4\downarrow +2(H_4)_2SO_4(aq) \quad (12)$$

and/or conversion of V (IV) oxide to the soluble metavanadate, as per:

$$V_2O_4(s)+2NH_3(aq)+S°+2H_2O(aq) \rightarrow 2NH_4VO_3(aq)+H_2S(aq) \quad (13)$$

However, the excess quantities of vanadium ions present through tests 1-3 (Table 2) suggests that the extent of reactions 6, 8 and 9 were minimized under existing conditions, with the likelihood of reactions 5, 7 and 10 predominating.

The sulfided ammonium sulfate slurry undergoes liquid-solid separation. The liquid portion is an ammonium sulfate stream, containing less than 10 ppm total metals content, up-to 45 gpL sulfamate and up-to 1,000 ppm soluble sulfides, is further processed, such as by air oxidation and sulfamate hydrolysis, for recovering a purified ammonium sulfate product for other uses, such as fertilizer. In a final step, the solid residue remaining from separation may, optionally be recycled to the initial ammonia pressure leach for further recovery and separation of metals or transferred to other processes, such as disposal or reclamation. It is believed that the solids generated from sulfidation of the primary filtrate might contain contaminants, such as As and Cd, that could build-up over time in the circuit and potentially contaminate the ammonium molybdate, nickel sulfate and Amsul products. By including two sulfide precipitation circuits, the primary sulfidation step acts as a purge to remove from the entire system contaminants that may then be shipped off-site for disposal.

Results of the secondary filtrate sulfidation process are shown in Table 3. The acidic secondary filtrate contains nickel levels of approximately 26 gpL, 100 gpL ammonium sulfate and less than 100 ppm of molybdenum and vanadium combined. The acidic solution pH is increased to 8 with ammonia addition followed by sulfidation with $H_2S$ gas at an overpressure of 100 kPa for less than 1-hour.

and/or $$(NH_4)_2MoO_4(aq) + 3H_2S(aq) \rightarrow (NH_4)_2MoS_4(aq) + 4H_2O \qquad (18)$$

As Table 3 indicates, all three metals precipitated to <5 ppm levels in the sulfided ammonium sulfate stream; although higher V and Mo levels may be present in the ammonium sulfate stream (as a result of reactions 13 & 15), it is believed that high volumes of generated NiS (>40,000 ppm) from reaction 11 acted as a co-precipitant to, at least partially, remove both Mo & V from the solution phase.

The sulfided ammonium sulfate slurry was then separated in a liquid-solid separation step and the secondary ammonium sulfate stream, containing less than 5 ppm total metals content, was combined with the primary Amsul stream and further processed, by air oxidation and sulfamate hydrolysis, for recovering a purified ammonium sulfate product for other uses, such as fertilizer. Analysis of the final ammonium sulfate stream indicated 400 gpL ammonium sulfate, with less than 10 ppm of combined soluble Mo, Ni and V species.

The filtered solids were washed with fresh water to remove adhering ammonium sulfate and soluble sulfides and repulped to a density of about 20 wt % solids. The slurry was acidified to a pH about 5 and introduced into a reactor for pressure leaching with oxygen gas at 165° C. and a total pressure of 1,100 kPag (160 psig). Table 4 illustrates com-

TABLE 3

Sulfidation of Ammonium Sulfate Solutions (100 gpL) with Ni (26 gpL) & Low Mo/V (<100 ppm)

| Test # | Feed this Type | $H_2S$ Over-pressure Kpa | Temp. ° C. | Time (min.) | pH | Mo mg/L | Ni mg/L | V mg/L | Total mg/L |
|---|---|---|---|---|---|---|---|---|---|
| 1 | Batch pilot sulfidation | 100 ~14.5 psi | 100 | 0 40 | 8.1 8.4 | 50 <1 | 26,500 <1 | 15 <1 | 26,565 <1 |
| 2 | Batch pilot sulfidation | 100 ~14.5 psi | | 0 40 | 8.4 8.0 | 42 <1 | 25700 <1 | 12 <1 | 25,754 <1 |

The pH is maintained between 7 and 8.5 at a temperature of 100° C. which results in a precipitate of Mo, Ni and V compounds according to the following reactions:

$$Ni(NH_3)_2SO_4(aq) + H_2S(g) \rightarrow NiS\downarrow + (NH_4)_2SO_4(aq) \qquad (14)$$

$$2NH_4VO_3(aq) + H_2S(aq) \rightarrow V_2O_4\downarrow + 2NH_3(aq) + S^0\downarrow + 2H_2O(aq) \qquad (15)$$

and/or $$NH_4VO_3(aq) + 4H_2S(aq) + 2NH_3(aq) \rightarrow (NH_4)_3VS_4(aq) + 3H_2O(aq) \qquad (16)$$

$$(NH_4)_2MoO_4(aq) + 3H_2S(aq) \rightarrow MoS_3(s) + 4H_2O(aq) + 2NH_3(aq) \qquad (17)$$

plete conversion of the NiS solids into nickel sulfate within 1-hour with the product solution at an acidic pH of less than 1. The following reactions are believed to occur:

$$NiS(s) + 2O_2(g) \rightarrow NiSO_4 \qquad (19)$$

$$V_2O_4(s) + 2H_2SO_4(aq) \rightarrow 2VOSO_4(aq) + 2H_2O \qquad (20)$$

$$S^0 3O_2(g) 2H_2O(aq) \rightarrow 2H_2SO_4 \qquad (21)$$

$$(NH_4)_2S(aq) + 2O_2(g) \rightarrow (NH_4)_2SO_4 \qquad (22)$$

$$MoS_3(s) + 6O_2(g) + 4H_2O(aq) \rightarrow H_2MoO_4(aq) + 3H_2SO_4 \qquad (23a)$$

and/or $$(H_4)_2MoS_4(aq) + 8O_2 + 4H_2O \rightarrow H_2MoO_4(aq) + (NH_4)_2SO_4(aq) + 3H_2SO_4(aq) \qquad (23b)$$

TABLE 4

Oxidation of NiS Cake from Sulfidation Step

| Test # | Temp ° C. | $O_2$ Pressure Psi | Total Pressure Psi | Wt % Solids | Initial pH | Final pH | Retention Time Hrs | Final Ni gpL | Ni Extm % |
|---|---|---|---|---|---|---|---|---|---|
| 1 | 165 | 72 | 159 | 21.9 | 4.5 | 0.9 | 2 | 75.1 five | >99% |
| 2 | 165 | 72 | 159 | 17 | 5.6 | 0.87 | 1 | 56.0 | >99% |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of recovering metals from finely divided metal sulfides, from metal sulphide ores, containing a Group VIB metal and a Group VIII metal, the method comprising the steps of:
contacting the finely divided metal sulfides with a leaching solution containing ammonia and air to dissolve the Group VIB metal and the Group VIII metal into the leaching solution at a sufficient temperature and pressure to form a pressure leach slurry containing at least a Group VIB soluble metal complex and at least a Group VIII soluble metal complex and solid residue;
separating and removing the solid residue from the pressure leach slurry and forming a pressure leach solution;
mixing the pressure leach solution with an additive selected from the group consisting of a mineral acid, a sulfide-containing compound, and a sulphur compound under mixing conditions at a temperature in the range of 50 to 90° C. for a sufficient amount of time to precipitate at least a portion of the Group VIB metal and at least a portion of the Group VIII metal, wherein the precipitation is carried out at a first pre-selected pH to precipitate as metal complexes at least a portion of the Group VIB metal and at least a portion of the Group VIII metal.

2. The method of claim 1, further comprising the step of:
recovering the precipitated metal complexes by at least a separation means selected from settling, filtration, decantation, centrifugation and combinations thereof, forming a first supernatant substantially free of at least a portion of the Group VIB metal and at least a portion of the Group VIII metal.

3. The method of claim 2, wherein the first supernatant contains 0.1 to 3% of the Group VIB metal and 1 to 35% of the Group VIII metal.

4. The method of claim 3, further comprising the step of:
precipitating from the first supernatant at least a portion of the Group VIB metal and at least a portion of the Group VIII metal, wherein the precipitation being carried out at a second pre-selected pH to precipitate as metal complexes at least 95% of the Group VIB metal and at least 95% of the Group VIII metal initially present in the first supernatant prior to the precipitation at the second pre-selected pH.

5. The method of claim 4, further comprising the step of:
recovering the Group VIB and group VIII metal sulfides by at least a separation means selected from settling, filtration, decantation, centrifugation and combinations thereof, forming a second supernatant containing less than 100 ppm of the group VIB metal and less than 20 ppm of the Group VIII metal.

6. The method of claim 1, wherein at least 90% of the Group VIB metal precipitates from the pressure leach solution as a metal complex.

7. The method of claim 1, wherein the Group VIB metal is molybdenum and wherein the first pre-selected pH is in the range of 2.5 to 3.3 to precipitate greater than 90% of the molybdenum as a molybdate complex.

8. The method of claim 7, wherein the pressure leach solution (PLS) is adjusted to the first pre-selected pH by adding to the PLS at least one of a mineral acid or a sulfur compound having a sulfhydryl group or an ionized sulfhydryl group, or mixtures thereof.

9. The method of claim 8, wherein the pH of the PLS is adjusted to a pH of 3.5 or less with an acid selected from the group of sulfuric acid, hydrochloric acid, phosphoric acid and nitric acid.

10. The method of claim 9, wherein the PLS is adjusted to a pH of 3 or less with the addition of a sulfuric acid for at least 95% of the molybdenum to precipitate out as a molybdate complex.

11. The method of claim 8, wherein the pH of the pressure leach solution is adjusted to a pH of 3 or less with at least one of a water soluble sulfide, a water soluble poysulfide, or mixtures thereof.

12. The method of claim 1, wherein the Group VIB metal is molybdenum, the Group VIII metal is nickel and wherein the first supernatant contains 0.1 to 3% of the molybdenum and 1 to 35% of the nickel.

13. The method of claim 12, wherein at least one of a water soluble sulfide, a water soluble poysulfide, or mixtures thereof is added to the first supernatant for a pH level of between 5 and 7 to obtain a precipitate of Mo and Ni sulfides.

14. The method of claim 13, wherein $H_2S$ is added to the first supernatant at a pressure from atmospheric to 100 psig and at a temperature ranging from 50 to 95° C.

15. The method of claim 5, wherein the Group VIB metal is molybdenum and the Group VIII metal is nickel, the pressure leach solution is adjusted to a pH of 3 or less with the addition of a sulfuric acid for at least 95% of the molybdenum to precipitate out as a molybdate complex, the molybdate complex is separated from the first supernatant by filtration, $H_2S$ is added to the first supernatant at a pressure from atmospheric to 100 psig and at a temperature ranging from 50-95° C. to obtain a precipitate of Mo and Ni, and V sulfides, the Mo and Ni sulfides are separated from the second supernatant by filtration, and wherein the second supernatant contains 100 to 1000 gpL ammonium sulfate, less than 100 ppm molybdenum and less than 20 ppm nickel.

16. A method of recovering metals from finely-divided metal sulfides, from metal sulphide ores, containing a Group VIB metal and a Group VIII metal, the method comprising the steps of:
contacting the finely-divided metal sulfides with a leaching solution containing ammonia and air to dissolve the Group VIB metal and the Group VIII metal into the leaching solution at a sufficient temperature and pressure to form a pressure leach slurry containing at least a Group VIB soluble metal complex and at least a Group VIII soluble metal complex, ammonium sulfate and solid residue;

separating and removing the solid residue from the pressure leach slurry forming a pressure leach solution;

mixing the pressure leach solution with an additive selected from the group consisting of a mineral acid, a sulfide-containing compound, and a sulphur compound under mixing conditions at a temperature in the range of 50 to 90° C. for a sufficient amount of time to precipitate at least a portion of the Group VIB metal and at least a portion of the Group VIII metal, wherein the precipitation being carried out at a first pre-selected pH to precipitate as metal complexes at least a portion of the Group VIB metal and at least a portion of the Group VIII metal;

wherein the finely-divided metal sulfides contain at least a Group VIII non-noble metal, a group Group VIB metal selected from Mo and W and combination thereof.

17. The method of claim 16, further comprising the steps of:

recovering the precipitated metal complexes by filtration, forming a first supernatant containing 0.1 to 3% of the Group VIB metal in the metal sulfides and 1 to 35% of the Group VIII metal in the metal sulfides;

precipitating from the first supernatant at least a portion of the Group VIB metal and at least a portion of the Group VIII metal, wherein the precipitation is carried out at a second pre-selected pH to precipitate as metal sulfides at least 95% of the Group VIB metal and at least 95% of the Group VIII metal initially present in the first supernatant prior to the precipitation at the second pre-selected pH;

recovering the Group VIB and Group VIII metal sulfides by filtration, forming a second supernatant containing less than 100 ppm of the Group VIB metal and less than 20 ppm of the Group VIII metal.

18. The method of claim 17, wherein the Group VIB metal is molybdenum and wherein the pre-selected pH is in the range of 2.5 to 3.3 to precipitate greater than 90% of the molybdenum.

19. The method of claim 17, wherein the finely-divided metal sulfides have a median particle size of 0.01 to 200 microns.

20. A method of recovering metals including vanadium from finely divided metal sulfides from metal sulphide ores, containing a Group VIB metal and a Group VIII metal, the method comprising the steps of:

contacting the finely divided metal sulfides with a leaching solution containing ammonia and air to dissolve the Group VIB metal and the Group VIII metal into the leaching solution at a sufficient temperature and pressure to form a pressure leach slurry containing at least a group VIB soluble metal complex and at least a group VIII soluble metal complex, ammonium sulfate and solid residue;

separating and removing the solid residue from the pressure leach slurry forming a pressure leach solution;

mixing the pressure leach solution with an additive selected from the group consisting of a mineral acid, a sulfide-containing compound, and a sulphur compound under mixing conditions at a temperature in the range of 50 to 90° C. for a sufficient amount of time to precipitate at least a portion of the Group VIB metal and at least a portion of the Group VIII metal, wherein the precipitation being carried out at a first pre-selected pH to precipitate as metal complexes at least a portion of the Group VIB metal and at least a portion of the Group VIII metal;

recovering the metal complexes by filtration, forming a first supernatant containing 0.1 to 3% of the Group VIB metal and 1 to 35% of the Group VIII metal;

precipitating from the first supernatant at least a portion of the Group VIB metal and at least a portion of the Group VIII metal, wherein the precipitation being carried out at a second pre-selected pH to precipitate as metal complexes at least 95% of the Group VIB metal and at least 95% of the Group VIII metal initially present in the first supernatant prior to the precipitation at the second pre-selected pH; and recovering the Group VIB and group VIII metal sulfides by filtration, forming a second supernatant containing less than 100 ppm of the group VIB metal and less than 20 ppm of the Group VIII metal.

21. A method for recovering metals from metal bearing materials from complex metal sulphide ores comprising:

(a) leaching finely divided sulfides of a Group VIB metal and a Group VIII metal with an ammonia containing leach solution at a temperature and a pressure sufficient to form a pressure leach slurry comprising at least a Group VIB soluble metal complex and at least a Group VIII soluble metal complex and a first solid residue;

(b) separating and removing the first solid residue from the pressure leach slurry to form a first pressure leach solution comprising the Group VIB soluble metal complex and the Group VIII soluble metal complex;

(c) precipitating from the first pressure leach solution, at a first pre-selected pH, a second solid residue comprising at least a portion of the Group VIB soluble metal complex to form a first slurry comprising the second solid residue and at least a portion of the Group VIII soluble metal complex;

(d) separating from the first slurry, the second solid residue and a primary filtrate substantially free of Group VIB and the Group VIII metals;

(e) dissolving the second solid residue at a second pre-selected pH to form a group VIB metal precipitate and a group VIII metal containing solution;

(f) separating the group VIB metal precipitate from the Group VIII metal containing solution; and (g) dissolving said Group VIB metal precipitate in a dilute base at a sufficient temperature to form a Group VIB soluble metal product.

22. The method of claim 21 wherein the step (f) further comprises (i) recovering a secondary filtrate comprising substantially the Group VIII soluble metal complex and a trace amount of the Group VIB metal;

(ii) combining the secondary filtrate with the primary filtrate from step (d) to form a combined filtrate comprising substantially the Group VIII soluble metal complex and a trace quantity of the Group VIB metal;

(iii) precipitating from the combined filtrate the Group VIB and Group VIII metals in a sulfidation process to form a third solid residue and a tertiary filtrate; and (iv) separating the third solid residue from the tertiary filtrate and dissolving the third solid residue to form a group VIII metal product solution.

23. The method of claim 22 further comprising, subjecting the tertiary filtrate to hydrolysis to form a purified solution.

24. The method of claim 23 wherein the purified solution is ammonium sulfate.

25. The method of claim 21 wherein the precipitation step (c) is carried out at a pH in a range between 2.5 to 3.5, at a temperature between about 75° C. and 85° C. for at least two hours.

26. The method of claim 22, wherein the separation steps (b), (d) and (f) each comprise at least a separation means selected from settling, filtration, decantation, centrifugation and combinations thereof.

27. The method of claim 22, wherein the primary filtrate comprises 0.1 to 3% of the Group VIB metal and 1 to 35% of the Group VIII metal.

28. The method of claim 22, wherein the combined filtrate comprises at least a portion of the Group VIB metal and at least a portion of the Group VIII metal, wherein the sulfidation process is carried out at a third pre-selected pH to precipitate as metal sulfides and oxy-hydroxides at least 95% of the Group VIB metal and at least 95% of the Group VIII metal present in the combined filtrate.

29. The method of claim 22, wherein the separation step (iv) comprises at least a separation means selected from settling, filtration, decantation, centrifugation and combinations thereof.

30. The method of claim 29 wherein the tertiary filtrate comprises less than 100 ppm of the group VIB metal and less than 20 ppm of the Group VIII metal.

31. The method of claim 21, wherein at least 90% of the Group VIB metal precipitates from the pressure leach solution as a metal complex.

32. The method of claim 21, wherein the Group VIB metal is molybdenum and wherein the first pre-selected pH is in the range of 2.5 to 3.3 to precipitate greater than 90% of the molybdenum as a molybdate complex.

33. The method of claim 32, wherein the pressure leach solution (PLS) is adjusted to the first pre-selected pH by adding to the PLS at least one of a mineral acid or a sulfur compound having a sulfhydryl group or an ionized sulfhydryl group, or mixtures thereof.

34. The method of claim 33, wherein the pH of the PLS is adjusted to a pH of 3.5 or less with an acid selected from the group of sulfuric acid, hydrochloric acid, phosphoric acid and nitric acid.

35. The method of claim 34, wherein the PLS is adjusted to a pH of 3 or less with the addition of a sulfuric acid for at least 95% of the molybdenum to precipitate out as an octamolybdate complex.

36. The method of claim 33, wherein the pH of the pressure leach solution is adjusted to a pH of 3 or less with at least one of a water soluble sulfide, a water soluble polysulfide, or mixtures thereof.

37. The method of claim 22, wherein at least one of a water soluble sulfide, a water soluble polysulfide, or mixtures thereof is added to the combined filtrate for a pH level of between 6 and 9 to obtain a precipitate of Mo and Ni.

38. The method of claim 37, wherein $H_2S$ is added to the combined filtrate at a pressure from atmospheric to 100 psig, a temperature ranging from 50 to 110° C. for at least 30 minutes.

39. The method of claim 22, wherein the Group VIB metal is molybdenum, the Group VIII metal is nickel, the pressure leach solution is adjusted to a pH of 3 or less with the addition of sulfuric acid to precipitate and form the second solid residue comprising at least 95% of the molybdenum as an octamolybdate complex and at least 75% of the nickel as a nickel ammonium sulfate compound, at least partially dissolving the second solid residue in acidic water having a pH of 2.5 or less at a temperature of 80° C. to form an octamolybdate precipitate and a solution of the double salt of nickel and dissolving the octamolybdate precipitate in a dilute ammonia at a temperature ranging from 50° C. to 75° C. to form an ammonium molybdate product.

40. The method of claim 39 further comprising: separating the octamolybdate precipitate from the double salt of nickel solution to form the secondary filtrate; combining the primary filtrate and the secondary filtrate to form the combined filtrate comprising at least 80% of the nickel, from 0.1 to 3% of the molybdenum, adding $H_2S$ to the combined filtrate at a pressure from atmospheric to 100 psig and at a temperature ranging from 50-110° C. to obtain the third solid residue, which comprises a precipitate of Mo and Ni sulfides; separating the Mo and Ni sulfides by filtration to obtain the tertiary filtrate, which comprises 100 to 1000 gpL ammonium sulphate, less than 100 ppm molybdenum and less than 20 ppm nickel.

41. The method of claim 40 further comprising: dissolving the third solid residue at a pH of five or less in the presence of oxygen at a temperature between 150° C. and 170° C., a total pressure ranging from 150 psig to 170 psig for a time between 30 minutes and 1.5 hours to obtain a nickel sulfate product solution.

42. A method for recovering metals bearing materials from metal sulphide ores comprising:
(a) leaching finely divided sulfides of a Group VIB metal and a Group VIII metal with an ammonia containing leach solution at a temperature and a pressure sufficient to form a pressure leach slurry comprising at least a Group VIB soluble metal complex and at least a Group VIII soluble metal complex and a first solid residue;
(b) separating and removing the first solid residue from the pressure leach slurry to form a first pressure leach solution comprising the Group VIB soluble metal complex and the Group VIII soluble metal complex;
(c) precipitating from the first pressure leach solution, at a first pre-selected pH, a second solid residue comprising at least a portion of the Group VIB soluble metal complex to form a first slurry comprising the second solid residue and at least a portion of the Group VIII soluble metal complex;
(d) separating from the first slurry, the second solid residue and a primary filtrate substantially free of Group VIB and the Group VIII metals;
(e) dissolving the second solid residue at a second pre-selected pH to form a Group VIB metal precipitate and a Group VIII metal containing solution;
(f) separating the Group VIB metal precipitate from the Group VIII metal containing solution;
(g) dissolving said Group VIB metal precipitate in a dilute base at a sufficient temperature to form a Group VIB soluble metal product;
(h) forming a secondary filtrate comprising substantially ammonium sulphate, the Group VIII soluble metal complex and trace amounts of the Group VIB metals;
(i) processing the primary filtrate in a primary precipitation method to form a primary solid residue and a primary liquid fraction and separately processing the secondary filtrate in a secondary precipitation method to form a secondary solid residue and a secondary liquid fraction;
(j) separating the primary solid residue from the primary liquid fraction and feeding the primary solid residue to step (a); and
(k) separating the secondary solid residue from the secondary liquid fraction and dissolving the secondary solid residue to form a Group VIII product solution.

43. The method of claim 42 further comprising combining the primary liquid fraction and the secondary liquid fraction to form a combined solution substantially free Group VIB and Group VIII metals.

44. The method of claim 43 further comprising combining the primary liquid fraction and the secondary liquid fraction to form a combined solution substantially free Group VIB and Group VIII metals.

45. The method of claim 44 further comprising subjecting the combined solution to sulfamate hydrolysis and sulfide oxidation at a temperature between 220° C. and 240° C., a pressure ranging from 2,000 kPa to 4,000 kPa and a retention time of between 0.5-hour and 1.5-hour to form a purified solution.

46. The method of claim 45 wherein the purified solution is ammonium sulfate.

47. The method of claim 42 wherein the precipitation step (c) is carried out at a pH not more than 3.0, at a temperature between about 75° C. and 85° C. for at least two hours.

48. The method of claim 42 wherein the separation steps (b), (d) and (f) each comprise at least a separation means selected from settling, filtration, decantation, centrifugation and combinations thereof.

49. The method of claim 43, wherein the primary filtrate comprises substantially ammonium sulfate and about 0.1 to 3% of the Group VIB metal and about 1 to 35% of the Group VIII metal.

50. The method of claim 43 wherein the primary precipitation method comprises sulfidation with a sulfur containing compound and a phosphate at a temperature and pressure and for a time sufficient to remove at least 95% of the Group VIB and Group VIII metals.

51. The method of claim 50 wherein the phosphate is a salt of di-ammonium hydrogen phosphate which is added to the primary filtrate immediately prior to sulfidation.

52. The method of claim 49 wherein the primary filtrate comprises less than 500 ppm nickel and less than 1000 ppm of molybdenum combined with an ammonium sulfate content of at least 400 gpL, the pH is initially adjusted to approximately 8 with ammonia and the primary precipitation method comprises sulfidation carried out at 100 kPa overpressure with hydrogen sulfide gas at a temperature between about 90° C. and 110° C. for 80 to 100 minutes and the pH is adjusted at least 2 times from basic to acidic and from acidic to basic.

53. The method of claim 43 wherein the secondary precipitation method comprises sulfidation with a sulfur containing compound at a temperature and pressure and for a time sufficient to remove at least 95% of the Group VIB and Group VIII metals.

54. The method of claim 52 wherein the sulfidation is carried out with hydrogen sulfide gas at an overpressure of 100 kPa, at a temperature between 90° C. and 120° C. at a pH between 8 and 9 and between 50 and 80 minutes.

55. The method of claim 43, wherein the separation steps (iii) and (iv) are separation means selected from settling, filtration, decantation, centrifugation and combinations thereof.

56. The method of claim 44 wherein the combined solution comprises less than 100 ppm of the group VIB metal and less than 20 ppm of the Group VIII metal.

57. The method of claim 42, wherein at least 90% of the Group VIB metal precipitates from the pressure leach solution as a metal complex.

58. The method of claim 42, wherein the Group VIB metal is molybdenum and wherein the first pre-selected pH is in the range of 2.5 to 3.3 to precipitate greater than 90% of the molybdenum as an octamolybdate complex.

59. The method of claim 57, wherein the pressure leach solution is adjusted to the first pre-selected pH by adding to said solution at least one of a mineral acid or a sulfur compound having a sulfhydryl group or an ionized sulfhydryl group, or mixtures thereof.

60. The method of claim 58, wherein the pH of the PLS is adjusted to a pH of 3.5 or less with an acid selected from the group of sulfuric acid, hydrochloric acid, phosphoric acid and nitric acid.

61. The method of claim 58, wherein the PLS is adjusted to a pH of 3 or less with the addition of a sulfuric acid to precipitate least 95% of the molybdenum as an octamolybdate complex.

62. The method of claim 58, wherein the pH of the pressure leach solution is adjusted to a pH of 3 or less with at least one of a water soluble sulfide, a water soluble polysulfide, or mixtures thereof.

63. The method of claim 43, wherein the Group VIB metal is molybdenum and the Group VIII metal is nickel, the pressure leach solution is adjusted to a pH of 3.5 or less with the addition of a sulfuric acid to precipitate and form the second solid residue comprising at least 95% of the molybdenum as an octamolybdate complex and at least 75% of the nickel as a nickel ammonium sulfate compound, dissolving the second solid residue in an acidic water having a pH of 2.5 or less at a temperature ranging between 75° C. and 85° C. to form an octamolybdate precipitate and a solution of a double salt of nickel and dissolving the octamolybdate precipitate in dilute ammonia at a temperature ranging from 50° C. to 75° C. to form an ammonium molybdate product.

64. The method of claim 63 further comprising: separating the octamolybdate precipitate from the double salt of nickel solution to form the secondary filtrate comprising at least 80% of the nickel, from 0.1 to 3% of the molybdenum, and from 1 to 20% of any vanadium; adding $H_2S$ to the secondary filtrate at a gas overpressure ranging from 100 kPa to 500 kPa and at a temperature ranging from 50-110° C. to precipitate the secondary solid residue comprising Mo and Ni sulfides and oxy-hydroxides, obtain the secondary liquid fraction comprising 100 to 1000 gpL ammonium sulfate, less than 100 ppm molybdenum and less than 20 ppm nickel separating the secondary solid residue and the secondary liquid fraction; dissolving the secondary solid residue at a pH of five or less in the presence of oxygen at a temperature between 150° C. and 170° C., a total pressure ranging from 150 psig to 170 psig for a time between 30 minutes and 1.5 hours to obtain a nickel sulfate product solution having a pH of less than 1; combining the secondary liquid fraction with the primary liquid fraction to form a combined solution; subjecting the combined solution to sulfamate hydrolysis and soluble sulfide species oxidation in the presence of steam and air at a temperature ranging between 220° C. and 240° C. to form a purified solution comprising of ammonium sulfate.

65. The method of claim 42, wherein the primary filtrate comprises less than 400 ppm nickel, less than 1000 ppm of molybdenum and an ammonium sulfate content of at least 400 gpL, the pH is initially adjusted to approximately 8 with ammonia; the primary precipitation method comprises sulfidation carried out between 90 kPa and 110 kPa overpressure with hydrogen sulfide gas at a temperature between about 90° C. and 110° C. for 60 to 80 minutes and the pH is adjusted at least 2 times from basic to acidic and from acidic to basic to form a primary liquid fraction and a primary solid residue; separating the primary liquid fraction and the primary solid residue; transferring the primary solid residue to step (a) combining the primary liquid fraction with the secondary liquid fraction to form the combined solution; subjecting the combined solution to sulfamate hydrolysis and sulfide oxidation in the presence of steam and air at a temperature ranging between 220° C. and 240° C. to form a purified solution comprising ammonium sulfate.

66. The method of claim 42, wherein at least one of a water soluble sulfide, a water soluble polysulfide, or mixtures thereof is added to the secondary filtrate for a pH level of between 6 and 9 to obtain Mo and Ni, precipitates from the ammonium sulfate solution.

67. The method of claim 51, wherein $H_2S$ is added to the primary filtrate at a gas overpressure from 100 kPa to 500 kPa and at a temperature ranging from about 90° C. to about 110° C.

* * * * *